(12) United States Patent
Han et al.

(10) Patent No.: US 11,842,018 B2
(45) Date of Patent: Dec. 12, 2023

(54) DISPLAY PANEL AND DISPLAY DEVICE INCLUDING THE SAME

(71) Applicant: LG Display Co., Ltd., Seoul (KR)

(72) Inventors: Jonghyun Han, Seoul (KR); Younggyu Moon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/903,767

(22) Filed: Sep. 6, 2022

(65) Prior Publication Data

US 2023/0205373 A1    Jun. 29, 2023

(30) Foreign Application Priority Data

Dec. 28, 2021    (KR) ........................ 10-2021-0190416

(51) Int. Cl.
*G06F 3/044*    (2006.01)
(52) U.S. Cl.
CPC .................................. *G06F 3/0443* (2019.05)
(58) Field of Classification Search
None
See application file for complete search history.

(56) References Cited

U.S. PATENT DOCUMENTS

| | | | |
|---|---|---|---|
| 11,604,551 B2* | 3/2023 | Wang | H10K 59/12 |
| 2017/0147128 A1* | 5/2017 | Ishizaki | G06F 3/0445 |
| 2018/0046301 A1* | 2/2018 | Zhou | G06F 3/0445 |
| 2019/0064960 A1* | 2/2019 | Na | G06F 3/0443 |
| 2019/0339818 A1* | 11/2019 | Rhe | G06F 3/0443 |
| 2021/0303104 A1* | 9/2021 | Yang | G06F 3/0443 |
| 2022/0223656 A1* | 7/2022 | Kim | G06F 3/0446 |

* cited by examiner

*Primary Examiner* — Duane N Taylor, Jr.
(74) *Attorney, Agent, or Firm* — Birch, Stewart, Kolasch & Birch, LLP

(57) ABSTRACT

A display device can include an optical electronic device disposed in a display area. To address a reduction of sensitivity of a touch panel disposed in a first sub-display area of the display area in which the optical electronic is disposed, an edge of a touch electrode in the first sub-display area can be provided with a finger part, a size of the touch electrode in the first sub-display area can be reduced, or a sub-touch electrode can be connected to the touch electrode in the first sub-display area, thereby increasing sensing sensitivity of the touch electrode.

15 Claims, 21 Drawing Sheets

DISPLAY PANEL AND DISPLAY DEVICE INCLUDING THE SAME

CROSS REFERENCE TO RELATED APPLICATION

This application claims priority to Korean Patent Application No. 10-2021-0190416, filed in the Republic of Korea on Dec. 28, 2021, the entire contents of which are hereby expressly incorporated by reference for all purposes as if fully set forth herein.

BACKGROUND OF THE INVENTION

1. Field of the Invention

The present disclosure relates to a display panel and a display device including the same, and more particularly, to a display panel including an under-display camera (UDC) area, on which optical devices such as a camera or various types of sensors are disposed, at the back of a display area, and having a touch panel structure for increasing touch sensitivity of a touch panel corresponding to the UDC area, when the touch panel is included in the display panel, and a display device including the same.

2. Description of the Related Art

With technological development, display devices can provide not only a function of displaying an image but also an image capturing device using a camera, a three-dimensional (3D) sensing device, various types of detection devices using light wave detection and ranging (LiDAR) or time of flight, etc. To this end, a display device can include an optical electronic device (also referred to as a light-receiving device or a sensor) such as a camera and a sensor.

The optical electronic device is required to receive light from a front side of the display device and thus should be installed in a place at which light is easily received. Therefore, in general, a camera (camera lens) and a detecting sensor are installed to be exposed on a front side of a display device. Thus, there have been attempts to increase the size of a bezel of a display panel or form a notch part or physical holes in a display area of the display panel so as to install a camera or various types of detecting devices.

SUMMARY OF THE DISCLOSURE

To address the above noted issues and other issues associated with the related art, a technology for providing optical electronic devices such as a camera and a detecting sensor without reducing an area of a display area of a display panel is being studied.

Accordingly, the inventors of the present application have invented a display panel having a light transmission structure in which optical electronic devices are provided at the back side of a display area of the display panel to allow the optical electronic devices to receive light normally without exposing the optical electronic devices on a front side of a display device, and the display device.

Embodiments of the present disclosure provide a display panel in which optical electronic devices are provided at the back of a display area of the display panel to reduce an area of a non-display area of the display panel and prevent the optical electronic devices from being exposed on a front side of a display device, and the display device.

Embodiments of the present disclosure provide a display panel in which a touch panel is provided on a front side of a display area of the display panel while preventing a decrease in touch sensitivity in the entire display area including an under-display camera (UDC) area, and a display device.

A display device according to an embodiment of the present disclosure includes a display panel including a display area and a non-display area around the display area, wherein the display area includes a first sub-display area including a plurality of light transmission areas and a second sub-display area around the first sub-display area; an optical electronic device disposed at the back side of the display area and overlapping the first sub-display area; and a net type touch panel disposed on a front side of the display panel and including a first touch area corresponding to the first sub-display area and a second touch area corresponding to the second sub-display area, wherein meshes of the first touch area are larger than meshes of the second touch area, and an area corresponding to each other between each touch electrode in the first touch area is greater than an area corresponding to each other between each touch electrode in the second touch area.

The touch panel can include a capacitive touch electrode configured to detect a capacitance generated between a driving touch electrode and a sensing touch electrode by a mutual capacitance sensing method.

A size of each touch electrode in the first touch area and a size of each touch electrode in the second touch area can be substantially the same.

An edge of each touch electrode in the first touch area can be provided with a first finger part extending toward neighboring touch electrodes facing to each other, and an edge of each touch electrode in the second touch area can be provided with a second finger part extending toward neighboring touch electrodes facing to each other, wherein an area facing between the edge of each touch electrode having the first finger parts can be greater than an area facing between the edge of each touch electrode having having the second finger parts.

The first finger part can be longer than the second finger part.

A display device according to an embodiment of the present disclosure includes a display panel including a display area and a non-display area around the display area, wherein the display area includes a first sub-display area including a plurality of light transmission areas and a second sub-display area around the first sub-display area, an optical electronic device disposed at the back side of the display area and overlapping the first sub-display area, and a net type touch panel disposed on a front side of the display panel and including a first touch area corresponding to the first sub-display area and a second touch area corresponding to the second sub-display area, wherein meshes of the first touch area are larger than meshes of the second touch area, and a size of each touch electrode in the first touch area is less than a size of each touch electrode in the second touch area.

The touch panel can include a capacitive touch electrode configured to detect a capacitance generated between a driving touch electrode and a sensing touch electrode by a mutual capacitance sensing method.

At least one driving touch electrode in the first touch area can be directly connected to a driving touch line, and at least one sensing touch electrode in the first touch area can be indirectly connected to a sensing touch line.

The number of bridge electrodes connecting touch electrodes disposed in the first touch area can be greater than the number of bridge electrodes connecting touch electrodes disposed in a region (the region is also referred to as the second touch region) of the second touch area when comparing a unit area of same size.

Sizes of touch electrodes in the first touch area can be the same, and sizes of touch electrodes in the second touch area can be the same.

The touch panel can be disposed on a touch interlayer insulating layer, and the display device can further include net type sub-touch electrodes disposed on a rear side of the touch interlayer insulating layer and electrically connected to touch electrodes of the touch panel that are disposed in the first touch area.

A touch electrode separated from a neighboring touch electrode among the touch electrodes disposed on the same touch line can be electrically connected to the neighboring touch electrode through the sub-touch electrode disposed on the same touch line.

A display device according to an embodiment of the present disclosure includes a display panel including a display area and a non-display area around the display area, wherein the display area includes a first sub-display area including a plurality of light transmission areas and a second sub-display area around the first sub-display area; an optical electronic device disposed at the back side of the display area and overlapping the first sub-display area; a touch interlayer insulating layer on an upper side of the display panel; a net type touch panel disposed on a one side of the touch interlayer insulating layer and including a first touch area corresponding to the first sub-display area and a second touch area corresponding to the second sub-display area.

Meshes of the first touch area are larger than meshes of the second touch area, and the display device can further include a net type sub-touch panel disposed on the other side of the touch interlayer insulating layer and electrically connected to the touch panel disposed in the first touch area.

The touch panel can include driving touch electrodes and sensing touch electrodes in a form of a net, and the sub-touch panel can include sub-driving touch electrodes and sub-sensing touch electrodes in a form of a net, wherein the driving touch electrodes or the sensing touch electrodes can be connected through one of the sub-driving touch electrode and the sub-sensing touch electrode that are disposed on the other side of the touch interlayer insulating layer.

When the driving touch electrodes are arranged and connected along a driving touch line, the sensing touch electrodes can be arranged along a sensing touch line crossing the driving touch line and disconnected from each other at an intersection of the driving touch line and the sensing touch line, and can be electrically connected to each other through the sub-sensing electrode.

Meshes of the first touch area can be larger by an integer multiple of the meshes of the second touch area.

The sensing touch electrode and the sub-sensing electrode can be connected to each other through a contact hole formed in the touch interlayer insulating layer.

Sub-driving touch electrodes arranged along the driving touch line can be physically separated from each other and each electrically connected to corresponding one of the driving touch electrodes.

Sensing touch electrodes arranged along the sensing touch line can be physically separated from each other and each electrically connected to corresponding one of sub-sensing touch electrodes.

The present disclosure provides a touch panel in which optical electronic devices such as a camera and a detecting sensor are disposed at the back side of a display area to secure a large area of the display area, and which is capable of increasing touch sensitivity while reducing a density of a touch electrode of a touch area in which optical electronic devices area arranged when the touch panel is included in or added to an upper side of a display panel.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
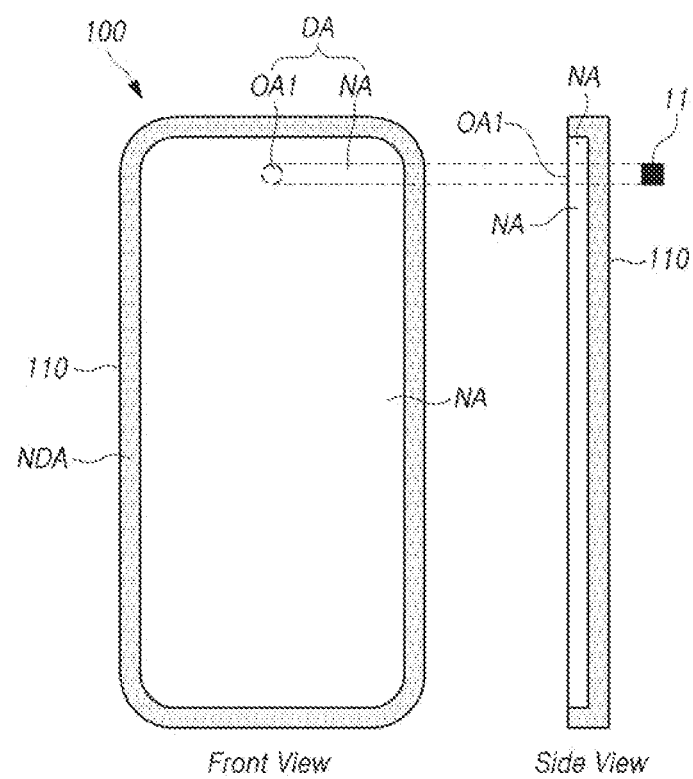
FIGS. 1A and 1B are plan views of a display device according to embodiments of the present disclosure.

Advantages and features of the present disclosure and methods of achieving them will be apparent from embodiments described in detail below, in conjunction with the accompanying drawings. However, the present disclosure is not limited to the embodiments set forth herein and can be embodied in many different forms. The embodiments are merely provided so that this disclosure will be thorough and complete and will fully convey the scope of the present disclosure to those of ordinary skill in the art. The present disclosure should be defined by the scope of claims.

Shapes, sizes, ratios, angles, total numbers, etc. illustrated in the drawings to describe embodiments of the present disclosure are only examples and thus the present disclosure is not limited thereto. The same reference numerals refer to the same components throughout the specification. In the following description of the present disclosure, related well-known technologies are not described in detail when it is determined that they would obscure the subject matter of the present disclosure due to unnecessary detail. It will be understood that terms "comprise", "have", "include", etc., when used herein, can include the addition of other components unless "only" is used. As used herein, singular forms are intended to include plural forms as well, unless the context clearly indicates otherwise.

It will be understood as including an error range in interpreting components, unless the content clearly indicates otherwise.

When a positional relationship between two parts is described using, for example, "on", "above", "below", "beside", or the like, one or more other parts can be positioned between the two parts, unless "immediately" or "directly" is used.

When a temporal relationship, i.e., a temporarily contextual relationship, is described using, for example, "after", "subsequent to", "next to", "before", etc., such terms should be understood as including discontinuity, unless "immediately" or "directly" is used.

Although "first", "second", etc. are used herein to describe various components, the components are not limited by these terms. These terms are only used to distinguish one component from another. Therefore, a first component described below could be termed a second component without departing from the technical scope of the present disclosure.

Features of various embodiments of the present disclosure can be partially or entirely combined with each other or be implemented technically in association with each other in various ways, and the embodiments can be implemented independently or together with each other.

Hereinafter, various embodiments of the present disclosure will be described in detail with reference to the accompanying drawings. All the components of each display device according to all embodiments of the present disclosure are operatively coupled and configured.

Figure 1B:
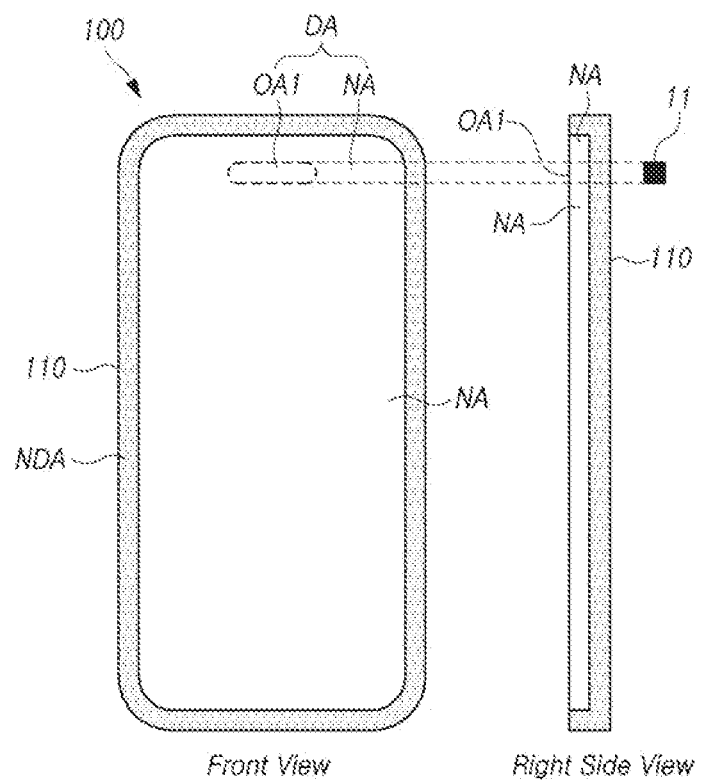

FIGS. 1A and 1B are plan views of a display device 100 according to embodiments of the present disclosure.

Referring to FIGS. 1A and 1B, the display device 100 according to the embodiments of the present disclosure can include a display panel 110 that displays an image, and one or more optical electronic devices 11.

The display panel 110 can include a display area DA in which an image is displayed and a non-display area NDA in which an image is not displayed.

In the display area DA, a plurality of subpixels and various types of signal lines for driving the plurality of subpixels can be arranged.

The non-display area NDA can be an area outside the display area DA. In the non-display area NDA, various types of signal lines can be arranged and various types of driving circuits can be connected. The non-display area NDA can be bent and thus may not be visible from ahead or can be hidden by a case. The non-display area NDA is also called a bezel or a bezel area.

In the display device 100 according to the embodiments of the present disclosure, the one or more optical electronic devices 11 refer to electronic components on a rear side (opposite to a viewing side) of the display panel 110.

Light can enter a front side (viewing side) of the display panel 110, pass through the display panel 110, and thereafter be transmitted to the one or more optical electronic devices 11 on the rear side (opposite to the viewing side) of the display panel 110.

The one or more optical electronic devices 11 can include an image capturing device using a camera, a detecting sensor such as a proximity sensor or an illumination sensor, a three-dimensional (3D) sensing device, various types of detection devices using light wave detection and ranging (LiDAR) or time of flight, and the like.

In the display panel 110, the display area DA can include a general area NA and one or more optical areas OA1. Here, the general area NA is a second sub-display area which is a display area having no structure for improving light transmittance to increase sensitivity of the optical electronic device 11. The optical area OA1 is an area having a structure for improving light transmittance to increase sensitivity of the optical electronic device 11. Hereinafter, the optical area OA1 is also referred to as a first sub-display area. Thus, the display area DA includes the first sub-display area OA1 and the second sub-display area NA.

Referring to FIGS. 1A and 1B, the first sub-display area OA1 can be an area that overlaps the one or more optical electronic devices 11.

FIG. 1A illustrates that the first sub-display area OA1 has a circular structure but a shape of the first sub-display area OA1 according to embodiments of the present disclosure is not limited thereto.

For example, as shown in FIG. 1B, the first sub-display area OA1 can have an octagonal shape or other various polygonal shapes.

In the first sub-display area OA1, both an image display structure and a light transmission structure can be formed. For example, the first sub-display area OA1 is a part of the display area DA and subpixels for displaying an image can be disposed on the first sub-display area OA1. In addition, the light transmission structure for transmitting light with one or more optical electronic devices 11 can be formed on the first sub-display area OA1.

The optical electronic device 11 is a device that needs to receive light but is located on a rear side (a bottom or a side opposite to the viewing side) of the display panel 110 and receives light transmitted through the display panel 110.

The optical electronic device 11 is not exposed on the front side (viewing side) of the display panel 110. Thus, when a user views a screen of the display device 100, the optical electronic device 11 is not visible.

The first sub-display area OA1 can be divided into a plurality of areas. For example, when a plurality of optical electronic devices 11 such as a camera, an illumination sensor, and a LiDAR device are arranged, the first sub-display area OA1 can be divided into sub-display areas corresponding to the optical electronic devices 11. However, for convenience of description, one optical electronic device 11 and the first sub-display area OA1 corresponding thereto will be described herein.

Both the second sub-display area NA and the first sub-display area OA1 that are included in the display area DA are areas in which images can be displayed, but the second sub-display area NA does not need the light transmission structure, and the first sub-display area OA1 needs the light transmission structure. Thus, the first sub-display area OA1 should have a light transmittance greater than or equal to a certain level, and the second sub-display area NA can have no light transmittance or a light transmittance less than the certain level.

For example, the first sub-display area OA1 and the second sub-display area NA can be different from each other in terms of a resolution, an arrangement of subpixels, the number of subpixels per unit area, an electrode structure, an interconnection structure, an arrangement of electrodes, or an arrangement of interconnections.

For example, the number of subpixels per unit area in the first sub-display area OA1 can be less than that in the second sub-display area NA. For example, a resolution of the first sub-display area OA1 can be lower than that of the second sub-display area NA. Here, the number of subpixels per unit area is a resolution measurement unit and can be understood as pixels per inch (PPI), i.e., the number of pixels per inch.

In other words, a PPI of the first sub-display area OA1 can be lower than that in the second sub-display area NA.

The first sub-display area OA1 can have various shapes such as a circular shape, an elliptical shape, a quadrangular shape, or a hexagonal shape. For convenience of description, an example in which the first sub-display area OA1 has an elliptical shape will be described here.

When the optical electronic device 11 hidden below the display panel 110 is a camera, the display device 100 according to embodiments of the present disclosure can be a display to which under display camera (UDC) technology, which is a commercial term, is applied. In the present specification, C in UDC should be understood to include not only a camera but also various types of optical electronic devices. The first sub-display area OA1 can be also referred to as a UDC area.

Accordingly, in the case of the display device 100 according to embodiments of the present disclosure, because notches or camera holes need not be formed in the display panel 110 to expose a camera, a reduction of an area of the display area DA can be prevented, a size of a bezel area can be reduced, and a screen can be designed freely without design constraints.

Figure 2:
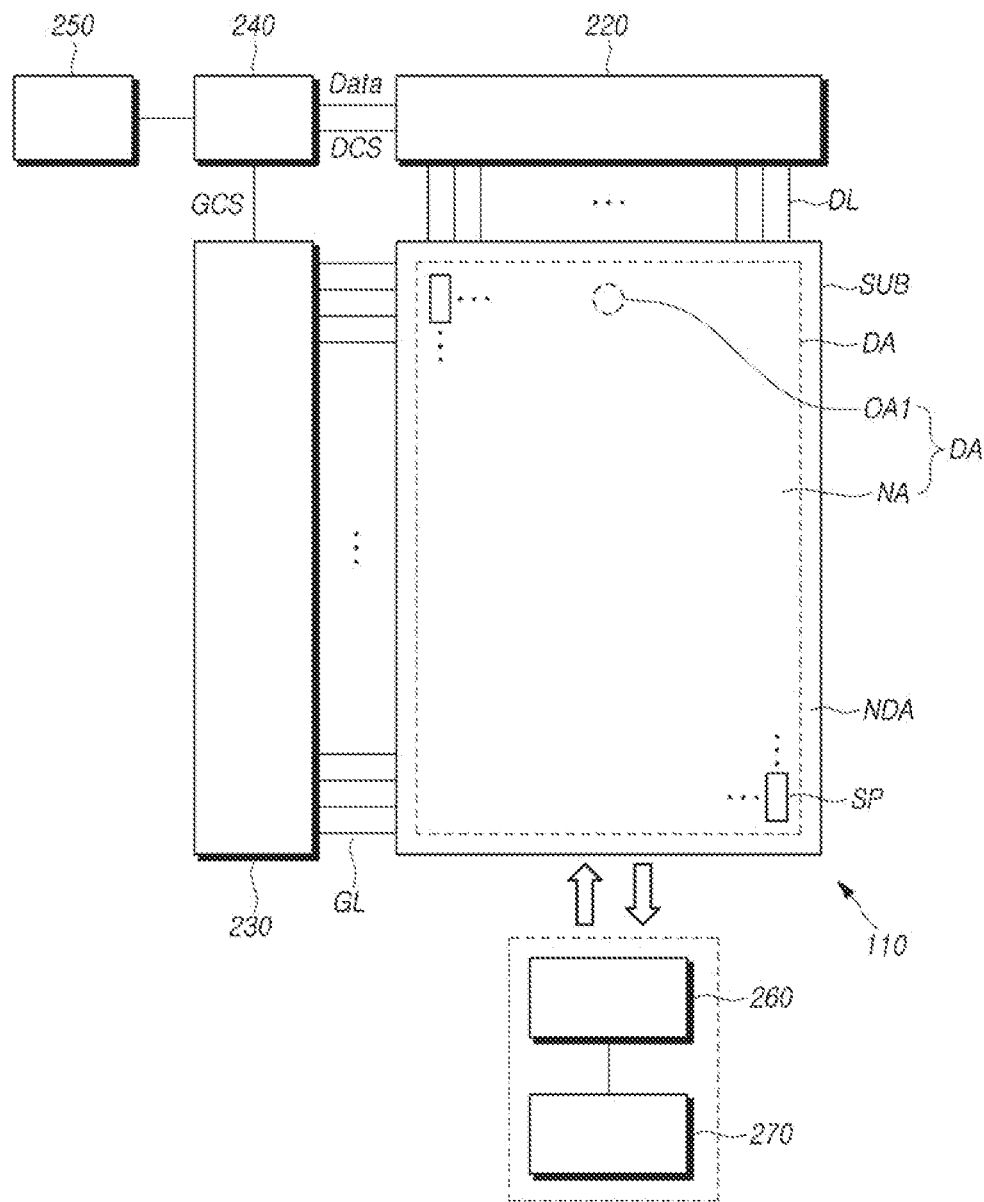
FIG. 2 is a system configuration diagram of a display device according to embodiments of the present disclosure.

FIG. 2 is a system configuration diagram of a display device 100 according to embodiments of the present disclosure.

Referring to FIG. 2, the display device 100 can include a display panel 110 and a display driving circuit as components for displaying an image.

The display driving circuit can include a data driving circuit 220, a gate driving circuit 230, a display controller 240, etc., as circuits for driving the display panel 110.

The display panel 110 can include a display area DA in which an image is displayed and a non-display area NDA in which an image is not displayed. The non-display area NDA can be an outer area of the display area DA and can be considered as a bezel area. The entire non-display area NDA or a part thereof can be an area visible from the front of the display device 100 or can be bent and thus not be visible from the front of the display device 100.

The display panel 110 can include a substrate SUB and a plurality of subpixels SP on the substrate SUB. The display panel 110 can further include various types of signal lines to drive the plurality of subpixels SP.

The display device 100 according to embodiments of the present disclosure can be a liquid crystal display device or a self-emitting display device in which the display panel 110 emits light by itself. When the display device 100 according to the embodiments of the present disclosure is a self-emitting display device, each of the plurality of subpixels SP can include a light-emitting element.

For example, the display device 100 according to embodiments of the present disclosure can be an organic light-emitting display device in which a light-emitting element is embodied as an organic light-emitting diode (OLED). As another example, the display device 100 according to embodiments of the present disclosure can be an inorganic light-emitting display device in which a light-emitting element is embodied as an inorganic material-based light-emitting diode. As another example, the display device 100 according to embodiments of the present disclosure can be a quantum dot display device in which a light-emitting element is embodied as quantum dots that are semiconductor crystals that emit light by themselves.

A structure of each of the plurality of subpixels SP can vary according to a type of the display device 100. For example, when the display device 100 is a self-emitting display device in which subpixels SP emit light by themselves, each of the subpixels SP can include a light-emitting element that emits light by itself, one or more transistors, and one or more capacitors.

For example, various types of signal lines can include a plurality of data lines DL for transmitting data signals (which can be also referred to as data voltages or image signals), a plurality of gate lines GL for transmitting gate signals (which can be also referred to as scan signals), and the like.

The plurality of data lines DL and the plurality of gate lines GL can cross each other. The plurality of data lines DL can be arranged while extending in a first direction. The plurality of gate lines GL can be arranged while extending in a second direction.

Here, the first direction can be a column direction and the second direction can be a row direction. Alternatively, the first direction can be the row direction and the second direction can be the column direction.

The data driving circuit 220 is a circuit for driving the plurality of data lines DL and can output data signals to the data lines DL. The gate driving circuit 230 is a circuit for driving the plurality of gate lines GL and can output gate signals to the gate lines GL.

The display controller 240 is a device for controlling the data driving circuit 220 and the gate driving circuit 230 and can control drive timing of the plurality of data lines DL and drive timing of the plurality of gate lines GL.

The display controller 240 can supply a data driving control signal DCS to the data driving circuit 220 to control the data driving circuit 220, and supply a gate driving control signal GCS to control the gate driving circuit 230 to control the gate driving circuit 230.

The display controller 240 can receive input image data from a host system 250 and supply image data Data to the data driving circuit 220 on the basis of the input image data.

The data driving circuit 220 can supply data signals to the plurality of data lines DL according to drive timing controlled by the display controller 240.

The data driving circuit 220 can receive digital image data Data from the display controller 240, convert the received image data Data into analog data signals, and output the analog data signals to the plurality of data lines DL.

The gate driving circuit 230 can supply gate signals to the plurality of gate lines GL according to timing controlled by the display controller 240. The gate driving circuit 230 can be supplied with a first gate voltage corresponding to a turn-on voltage and a second gate voltage corresponding to a turn-off voltage, as well as the gate driving control signal GCS, generate gate signals, and supply the gate signals to the plurality of gate lines GL.

For example, the data driving circuit 220 can be connected to the display panel 110 by a tape automated bonding (TAB) method, connected to a bonding pad of the display panel 110 by a chip-on glass (COG) or chip-on panel (COP) method, or connected to the display panel 110 by a chip-on film (COF) method.

The gate driving circuit 230 can be connected to the display panel 110 by the TAB method, connected to the bonding pad of the display panel 110 by the COG or COP method, or connected to the display panel 110 by the COF method. Alternatively, the gate driving circuit 230 can be a gate-in panel (GIP) type and be formed on the non-display area NDA of the display panel 110. The gate driving circuit 230 can be disposed on or connected to a substrate. For example, the gate driving circuit 230 can be disposed on the non-display area NDA of the substrate when the gate driving circuit 230 is a GIP type. The gate driving circuit 230 can be connected to the substrate when the gate driving circuit 230 is a COG type, a COF type or the like.

At least one of the data driving circuit 220 and the gate driving circuit 230 can be disposed on the display area DA of the display panel 110. For example, at least one of the data driving circuit 220 and the gate driving circuit 230 can be disposed not to overlap the subpixels SP or disposed to overlap some or all of the subpixels SP.

The data driving circuit 220 can be connected to one side (e.g., an upper or lower side) of the display panel 110. According to a driving method, a panel design method or the like, the data driving circuit 220 can be connected to both sides (e.g., upper and lower sides) of the display panel 110 or two or more of four sides of the display panel 110.

The gate driving circuit 230 can be connected to one side (e.g., a left or right side) of the display panel 110. According to a driving method, a panel design method or the like, the gate driving circuit 230 can be connected to both sides (e.g., the left and right sides) of the display panel 110 or two or more of the four sides of the display panel 110.

The display controller 240 can be embodied as a component separated from the data driving circuit 220 or integrated into an integrated circuit (IC), together with the data driving circuit 220.

The display controller 240 can be a timing controller used in general display technology, a control device that includes a timing controller and thus can further perform other control functions, a control device separated from a timing controller, or a circuit included in a control device. The display controller 240 can be embodied as various types of circuits or electronic components such as an IC, a field programmable gate array (FPGA), an application specific integrated circuit (ASIC) or a processor.

The display controller 240 can be mounted on a printed circuit board, a flexible printed circuit or the like, and electrically connected to the data driving circuit 220 and the gate driving circuit 230 through the printed circuit board, the flexible printed circuit or the like.

The display controller 240 can transmit a signal to or receive a signal from the data driving circuit 220 according to one or more predetermined interfaces. Here, the one or more predetermined interfaces can include, for example, a low-voltage differential signaling (LVDS) interface, an EPI interface, a serial peripheral interface (SP), etc.

To provide not only an image display function but also a touch sensing function, the display device 100 according to embodiments of the present disclosure can include a touch sensor, and a touch sensing circuit that detects the touch sensor to detect whether a touch is generated by a touch object such as a finger or a pen or detect a touch position.

The touch sensing circuit can include a touch driving circuit 260 for driving and detecting the touch sensor to generate and output touch sensing data, a touch controller 270 for detecting a generated touch or a touch position using the touch sensing data.

The touch sensor can include a plurality of touch electrodes. The touch sensor can further include a plurality of touch lines to electrically connect the plurality of touch electrodes and the touch driving circuit 260.

The touch sensor can be provided in the form of a touch panel outside the display panel 110 or provided inside the display panel 110. When the touch sensor is provided in the form of a touch panel outside the display panel 110, the touch sensor is called an external type. When the touch sensor is the external type, the touch panel and the display panel 110 can be manufactured separately and combined together during an assembly process. An external type touch panel can include a substrate for a touch panel substrate and a plurality of touch electrodes on the substrate for a touch panel.

When the touch sensor is located inside the display panel 110, the touch sensor can be formed on the substrate SUB during the manufacture of the display panel 110, together with signal lines related to driving a display, electrodes, etc.

The touch driving circuit 260 can supply a touch driving signal to at least one of the plurality of touch electrodes, and generate touch sensing data by detecting at least one touch electrode of the plurality of touch electrodes.

The touch sensing circuit can detect a touch by a self-capacitance sensing method or a mutual-capacitance sensing method.

When the touch sensing circuit detects a touch by the self-capacitance sensing method, the touch sensing circuit can detect a touch on the basis of a capacitance between each of the plurality of touch electrodes and a touch object (e.g., a finger, a pen or the like).

According to the self-capacitance sensing method, each of the plurality of touch electrodes can act as a driving touch electrode and a sensing touch electrode. The touch driving circuit 260 can drive all or some of the plurality of touch electrodes and detect some or all of the plurality of touch electrodes.

When the touch sensing circuit detects a touch by the mutual-capacitance sensing method, the touch sensing circuit can detect a touch on the basis of a capacitance between the touch electrodes.

According to the mutual-capacitance sensing method, the plurality of touch electrodes are divided into driving touch electrodes and sensing touch electrodes. The touch driving circuit 260 can drive the driving touch electrodes and detect the sensing touch electrodes.

The touch driving circuit 260 and the touch controller 270 that are included in the touch sensing circuit can be embodied as separate devices or one device. In addition, the touch driving circuit 260 and the data driving circuit 220 can be embodied as separate devices or one device.

The display device 100 can further include a power supply circuit to supply various types of power to a display driving circuit and/or the touch sensing circuit.

The display device 100 according to the embodiments of the present disclosure can be a mobile terminal such as a smart phone and a tablet PC or monitors or televisions (TVs) having various sizes but is not limited thereto and can include displays of various types and sizes capable of displaying information or images.

Figure 3:
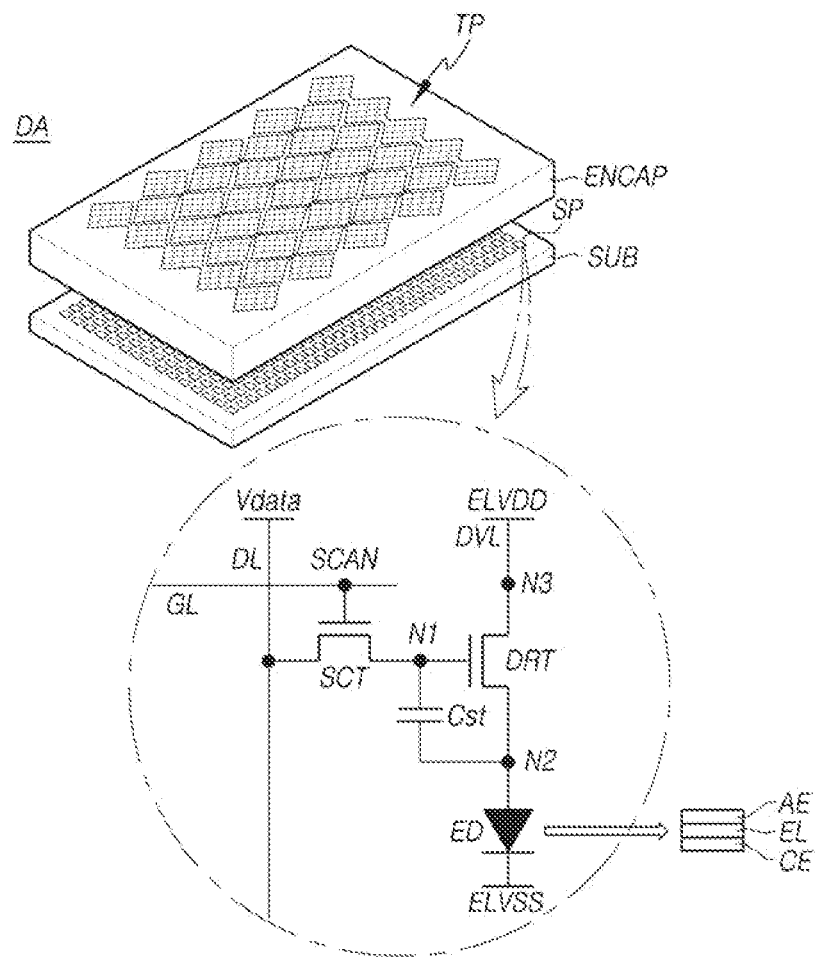
FIG. 3 illustrates an equivalent circuit of a subpixel in a display panel according to embodiments of the present disclosure.

FIG. 3 illustrates an equivalent circuit of a subpixel SP in a display panel 110 according to embodiments of the present disclosure.

Each of subpixels SP arranged in a second sub-display area NA and a first sub-display area OA1 of a display area DA of the display panel 110 can include a light-emitting element ED, a driving transistor DRT for driving the light-emitting element ED, a scan transistor SCT for applying a data voltage VDATA to a first node N1 of the driving transistor DRT, a storage capacitor Cst for maintaining a voltage constant for one frame period, and the like.

The driving transistor DRT can include the first node N1 to which a data voltage can be applied, a second node N2 electrically connected to the light-emitting element ED, and a third node N3 to which a driving voltage ELVDD is applied from a driving voltage line DVL. In the driving transistor DRT, the first node N1 can be a gate node, the second node N2 can be a source node or a drain node, and the third node N3 can be a drain node or a source node.

The light-emitting element ED can include an anode electrode AE, an emission layer EL, and a cathode electrode CE. The anode electrode AE can be a pixel electrode disposed on each subpixel SP, and be electrically connected to the second node N2 of the driving transistor DRT of each subpixel SP. The cathode electrode CE can be a common electrode commonly disposed on a plurality of subpixels SP, and a base voltage ELVSS can be applied to the cathode electrode CE.

For example, the anode electrode AE can be a pixel electrode and the cathode electrode CE can be a common electrode. On the contrary, the anode electrode AE can be a common electrode and the cathode electrode CE can be a pixel electrode. Hereinafter, for convenience of description, it is assumed that the anode electrode AE is a pixel electrode and the cathode electrode CE is a common electrode.

For example, the light-emitting element ED can be an organic light-emitting diode (OLED), an inorganic light-emitting diode, a quantum dot light-emitting element, or the like. In this case, when the light-emitting element ED is an OLED, the emission layer EL of the light-emitting element ED can include an organic emission layer containing an organic material.

The scan transistor SCT can be controlled to be turned on or off by a scan signal SCAN supplied through a gate line GL, and be electrically connected between the first node N1 of the driving transistor DRT and the data line DL.

The storage capacitor Cst can be electrically connected between the first node N1 and the second node N2 of the driving transistor DRT.

As shown in FIG. 3, each subpixel SP can have a 2-transistor (2T) 1-capacitor (1C) structure including two transistors DRT and SCT and one capacitor Cst, and can further include one or more transistors or one or more capacitors in some cases.

The storage capacitor Cst can not be a parasitic capacitor, which is an internal capacitor (e.g., Cgs, Cgd) that can be disposed between the first node N1 and the second node N2 of the driving transistor DRT, but can be an external capacitor intentionally designed to be located outside the driving transistor DRT.

Each of the driving transistor DRT and the scan transistor SCT can be an n type transistor or a p type transistor.

Because circuit elements in each subpixel SP (especially, the light-emitting element ED) are vulnerable to external moisture or oxygen, an encapsulation layer ENCAP can be disposed on the display panel 110 to prevent permeation of external moisture or oxygen into the circuit elements (especially, the light-emitting elements ED). The encapsulation layer ENCAP can be arranged to cover the light-emitting elements ED.

Figure 4:
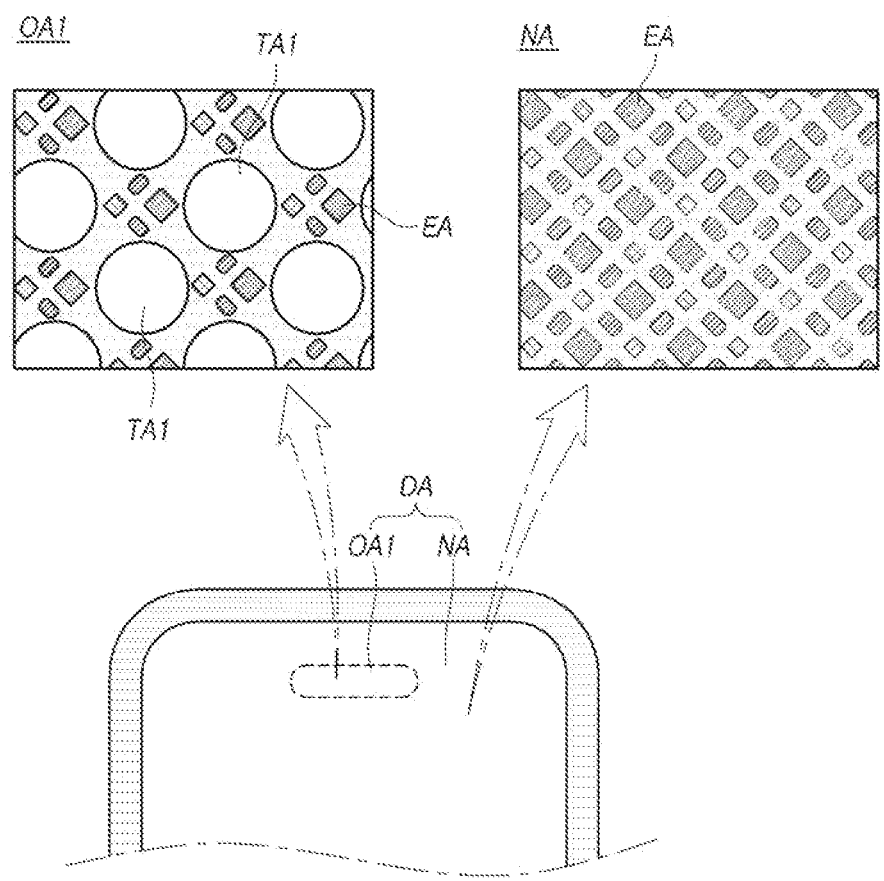
FIG. 4 is a layout diagram of subpixels in a first sub-display area included in a display area of a display panel according to embodiments of the present disclosure.

In embodiments of the present disclosure, a touch panel TP can be added on the encapsulation layer ENCAP The touch panel TP can be included into a side of the encapsulation layer ENCAP or an independent touch panel TP can be added on the encapsulation layer ENCAP FIG. 4 illustrates an arrangement of subpixels SP in a first sub-display area OA1 and a second sub-display area NA that are included in a display area DA of a display panel 110 according to embodiments of the present disclosure.

Referring to FIG. 4, a plurality of subpixels SP can be arranged in each of the second sub-display area NA and the first sub-display area OA1 that are included in the display area DA.

For example, the plurality of subpixels SP can include red subpixels SP that emit red light, green subpixels SP that emit green light, and blue subpixels SP that emit blue light.

Accordingly, each of the second sub-display area NA and the first sub-display area OA1 can include emission areas EA of the red subpixels SP, emission areas EA of the green subpixels SP, and emission areas EA of the blue subpixels SP.

Referring to FIG. 4, the second sub-display area NA may not include a light transmission structure and can include the emission areas EA.

However, the first sub-display area OA1 should include not only the emission areas EA but also the light transmission structure.

Thus, the first sub-display area OA1 can include the emission areas EA and transmission areas TA1.

The emission areas EA and the transmission areas TA1 can be distinguished from each other according to whether light is transmitted or not therewith. For example, the emission areas EA can be areas that do not allow light to pass therethrough, and the transmission areas TA1 can be an areas that allow light to pass therethrough.

The emission areas EA and the transmission areas TA1 can be distinguished from each other according to whether a certain metal layer, e.g., a cathode electrode CE, is formed or not. For example, the cathode electrode CE can be formed in the emission areas EA and may not be formed in the transmission areas TA1. A light shield layer can be formed in the emission areas EA and may not be formed in the transmission areas TA1.

The first sub-display area OA1 includes the transmission areas TA1 and thus is an area that allows light to pass therethrough.

As shown in FIG. 4, the transmission areas TA1 of the first sub-display area OA1 can have a circular plane but planar structures of the transmission areas TA1 according to embodiments of the present disclosure are not limited thereto.

As shown in FIG. 4, it is assumed that in the embodiments of the present disclosure, the first sub-display area OA1 is located at the top of the display area DA.

Figure 5:
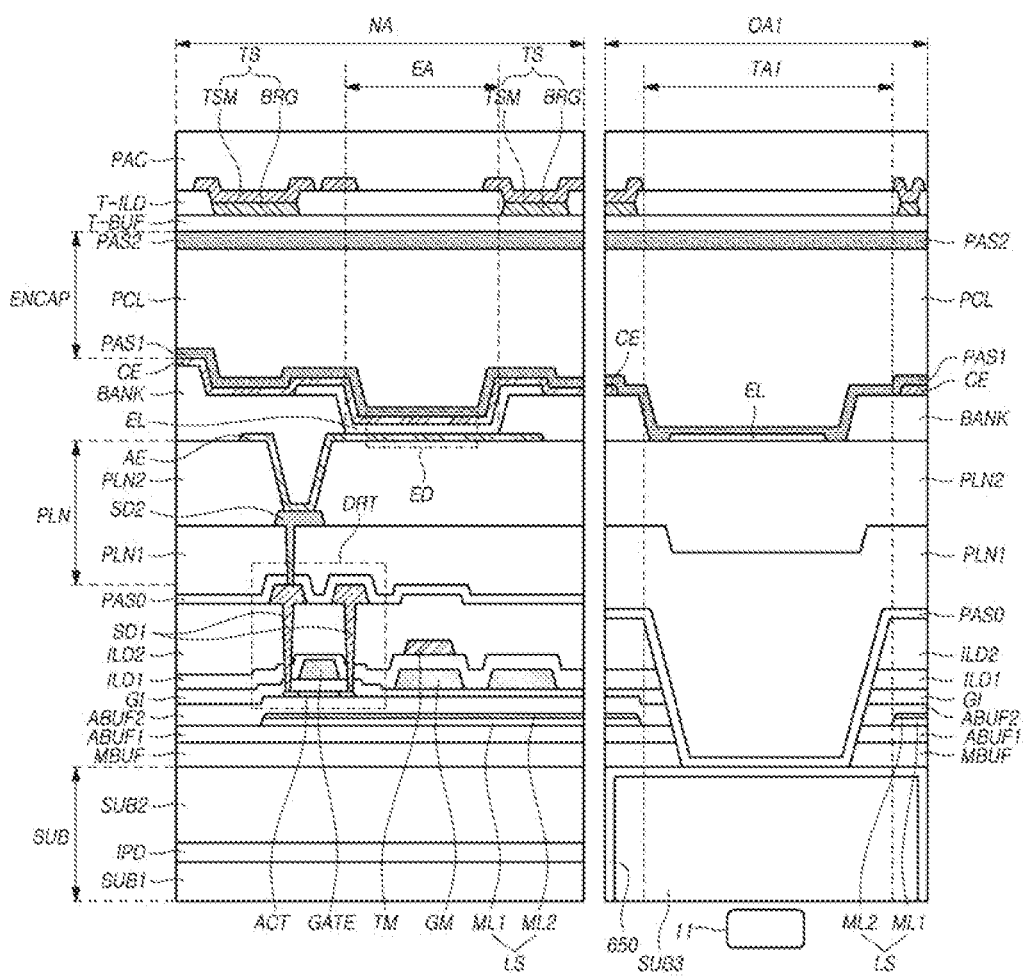
FIG. 5 is a cross-sectional view of a first sub-display area and a second sub-display area of a display panel according to embodiments of the present disclosure.

FIG. 5 is a cross-sectional view of a first sub-display area OA1 and a second sub-display area NA that are included in a display area DA of a display panel 110 according to the embodiments of the present disclosure.

Referring to FIG. 5, a stacked structure of the second sub-display area NA will be described below. For reference, an emission area EA in the first sub-display area OA1 can have the same stacked structure as an emission area EA in the second sub-display area NA.

Referring to FIG. 5, a substrate SUB can include a first substrate SUB1, an interlayer insulating film IPD, and a second substrate SUB2. The interlayer insulating film IPD can be located between the first substrate SUB1 and the second substrate SUB2. The substrate SUB can include the first substrate SUB1, the interlayer insulating film IPD, and the second substrate SUB2 to prevent permeation of moisture. For example, the first substrate SUB1 and the second substrate SUB2 can be polyimide (PI) substrates. The first substrate SUB1 can be referred to as a primary PI substrate, and the second substrate SUB2 can be referred to as a secondary PI substrate.

Various patterns ACT, SD1, and GATE for forming transistors such as a driving transistor DRT, various insulating films MBUF, ABUF1, ABUF2, GI, ILD1, ILD2, and PAS0, and various metal Patterns TM, GM, ML1, and ML2 can be arranged on the substrate SUB.

The multi-buffer layer MBUF can be disposed on the second substrate SUB2, and the first active buffer layer ABUF1 can be disposed on the multi-buffer layer MBUF.

A first metal layer ML1 and a second metal layer ML2 can be disposed on the first active buffer layer ABUF1. Here, the first metal layer ML1 and the second metal layer ML2 can be light shield layers LS that block light.

The second active buffer layer ABUF2 can be disposed on the first metal layer ML1 and the second metal layer ML2. The active layer ACT of the driving transistor DRT can be disposed on the second active buffer layer ABUF2.

The gate insulating film GI can be disposed while covering the active layer ACT.

The gate electrode GATE of the driving transistor DRT can be disposed on the gate insulating film GI. In this case, the gate material layer GM can be disposed on a location on the gate insulating film GI, which is different from a location at which the driving transistor DRT is formed, together with the gate electrode GATE of the driving transistor DRT.

The first interlayer insulating film ILD1 can be disposed while covering the gate electrode GATE and the gate material layer GM. The metal pattern TM can be disposed on the first interlay insulating film ILD1. The metal pattern TM can be provided at a location different from a location at which the driving transistor DRT is formed. The second interlayer insulating film ILD2 can be disposed while covering the metal pattern TM on the first interlayer insulating film ILD1.

Two first source-drain electrode patterns SD1 can be disposed on the second interlayer insulating film ILD2. One of the two first source-drain electrode patterns SD1 is a source node of the driving transistor DRT, and the other is a drain node of the driving transistor DRT.

The two first source-drain electrode patterns SD1 can be electrically connected to one side of the active layer ACT and another side of the active layer ACT through contact holes in the second interlayer insulating film ILD2, the first interlayer insulating film ILD1, and the gate insulating film GI.

Apart of the active layer ACT that overlaps the gate electrode GATE is a channel area. One of the two first source-drain electrode patterns SD1 can be connected to one side of the channel area of the active layer ACT, and the other can be connected to another side of the channel area of the active layer ACT.

A passivation layer PAS0 is disposed while covering the two first source-drain electrode patterns SD1. The planarization layer PLN can be disposed on the passivation layer PAS0. The planarization layer PLN can include a first planarization layer PLN1 and a second planarization layer PLN2.

The first planarization layer PLN1 can be disposed on the passivation layer PAS0.

The second source-drain electrode pattern SD2 can be disposed on the first planarization layer PLN1. The second source-drain electrode pattern SD2 can be connected to one of the two first source-drain electrode patterns SD1 through a contact hole in the first planarization layer PLN1.

The second planarization layer PLN2 can be disposed while covering the second source-drain electrode pattern SD2. The light-emitting element ED can be disposed on the second planarization layer PLN2.

In a stacked structure of the light-emitting element ED, the anode electrode AE can be disposed on the second planarization layer PLN2. The anode electrode AE can be electrically connected to the second source-drain electrode pattern SD2 through the contact hole in the second planarization layer PLN2.

A bank BANK can be disposed while covering apart of the anode electrode AE. A part of the bank BANK corresponding to the emission area EA of the subpixel SP can be open.

A part of the anode electrode AE can be exposed through an opening (open part) of the bank BANK. The emission layer EL can be located on a side of the bank BANK and the opening (open part) of the bank BANK. The entire emission layer EL or a part thereof can be located between adjacent banks BANK.

In the opening of the bank BANK, the emission layer EL can be in contact with the anode electrode AE. The cathode electrode CE can be disposed on the emission layer EL.

The light-emitting element ED can be formed by the anode electrode AE, the emission layer EL, and the cathode electrode CE. The emission layer EL can include an organic film.

An encapsulation layer ENCAP can be disposed on the light-emitting element ED described above.

The encapsulation layer ENCAP can have a single-layer structure or a multilayer structure. For example, as shown in FIG. 5, the encapsulation layer ENCAP can include a first encapsulation layer PAS1, a second encapsulation layer PCL, and a third encapsulation layer PAS2.

For example, the first encapsulation layer PAS1 and the third encapsulation layer PAS2 can be inorganic films, and the second encapsulation layer PCL can be an organic film. Among the first encapsulation layer PAS1, the second encapsulation layer PCL, and the third encapsulation layer PAS2, the second encapsulation layer PCL can be thickest and act as a planarization layer.

The first encapsulation layer PAS1 can be disposed on the cathode electrode CE to be most adjacent to the light-emitting element ED. The first encapsulation layer PAS1 can be formed of an inorganic insulating material that is depositable at low temperature. For example, the first encapsulation layer PAS1 can be silicon nitride ($SiN_x$), silicon oxide ($SiO_x$), silicone oxynitride (SiON) or aluminum oxide ($Al_2O_3$). Because the first encapsulation layer PAS1 is deposited in a low-temperature atmosphere, the first encapsulation layer PAS1 can prevent damage to the emission layer EL containing an organic material vulnerable in a high-temperature environment during deposition process.

An area of the second encapsulation layer PCL can be less than that of the first encapsulation layer PAS1. In this case, the second encapsulation layer PCL can be formed to expose both ends of the first encapsulation layer PAS1. The second encapsulation layer PCL can act as a buffer to alleviate stress between layers due to bending of the display device 100, and strengthen planarization performance. For example, the second encapsulation layer PCL can be acrylic resin, epoxy resin, polyimide, polyethylene, silicone oxycarbide (SiOC), or the like, and can be formed of an organic insulating material. For example, the second encapsulation layer PCL can be formed by an inkjet method.

The third encapsulation layer PAS2, which is an inorganic film, can be formed on the substrate SUB, on which the second encapsulation layer PCL is formed, to cover an upper side and a side of each of the second encapsulation layer PCL and the first encapsulation layer PAS1. The third encapsulation layer PAS2 can minimize or block permeation of external moisture or oxygen into the first encapsulation layer PAS1, which is an inorganic film, and the second encapsulation layer PCL, which is an organic film. For example, the third encapsulation layer PAS2 can be formed of an inorganic insulating material such as silicon nitride ($SiN_x$), silicon oxide ($SiO_x$), silicone oxynitride (SiON) or aluminum oxide ($Al_2O_3$).

A touch sensor TS can be disposed on the encapsulation layer ENCAP. A touch sensor structure will be described in detail below.

A touch buffer layer T-BUF can be disposed on the encapsulation layer ENCAP The touch sensor TS can be disposed on the touch buffer layer T-BUF.

The touch sensor TS can include touch sensor metals TSM and a bridge electrode BRG that are located on different layers.

A touch interlayer insulating layer T-ILD can be disposed between the touch sensor metals TSM and the bridge electrode BRG. The touch sensor metals TSM can include driving touch electrodes and sensing touch electrodes.

For example, the touch sensor metals TSM can include a first touch sensor metal TSM, a second touch sensor metal TSM, and a third touch sensor metal TSM that are arranged adjacent to one another. When the third touch sensor metal TSM is located between the first touch sensor metal TSM and the second touch sensor metal TSM and the first touch sensor metal TSM and the second touch sensor metal TSM should be electrically connected to each other, the first touch sensor metal TSM and the second touch sensor metal TSM can be electrically connected to each other through the bridge electrode BRG located on a different layer. The bridge electrode BRG can be insulated from the third touch sensor metal TSM due to the touch interlayer insulating layer T-ILD.

When the touch sensor TS is formed on the display panel 110, moisture or the like can be generated from a liquid chemical (a developing solution, an etchant and the like) or the outside. By disposing the touch sensor TS on the touch buffer layer T-BUF, a liquid chemical, moisture or the like can be prevented from permeating the emission layer EL containing the organic material during the manufacture of the touch sensor TS. Accordingly, the touch buffer layer T-BUF can prevent damage to the emission layer EL vulnerable to the liquid chemical or moisture.

The touch buffer layer T-BUF can be formed at a low temperature equal to or lower than a certain temperature (e.g., 100° C.) and formed of an organic insulating material having low permittivity of 1 to 3 to prevent damage to the emission layer EL containing the organic material vulnerable to high temperatures. For example, the touch buffer layer T-BUF can be formed of an acrylic, epoxy, or siloxane-based material. When the display device 100 is bent, the encapsulation layer ENCAP can be damaged or a touch sensor metal on the touch buffer layer T-BUF can be broken. Even when the display device 100 is bent, the touch buffer layer T-BUF formed of an organic insulating material and having planarization performance can prevent the encapsulation layer ENCAP from being damaged and metals TSM and BRG of the touch sensor TS from being broken.

A protective layer PAC can be disposed while covering the touch sensor TS. The protective layer PAC can be an organic insulating film.

Next, a stacked structure of the first sub-display area OA1 will be described with reference to FIG. 5 below.

The emission area EA in the first sub-display area OA1 can have the same stacked structure as a stacked structure of the second sub-display area NA. Thus, a stacked structure of the transmission area TA1 in the first sub-display area OA1 will be described in detail below.

The cathode electrode CE can be disposed in the emission areas EA of the first sub-display area OA1 and the second sub-display area NA but may not be disposed in the transmission area TA1 included in the first sub-display area OA1. For example, the transmission area TA1 in the first sub-display area OA1 can correspond to an opening in the cathode electrode CE.

In addition, the light shield layer LS including at least one of the first metal layer ML1 and the second metal layer ML2 is disposed on the emission areas EA included in the second sub-display area NA and the first sub-display area OA1 but may not be disposed on the transmission area TA1 in the first sub-display area OA1. For example, the transmission area TA1 in the first sub-display area OA1 can correspond to an opening in the light shield layer LS.

The substrate SUB and the various insulating films (layers) MBUF, ABUF1, ABUF2, GI, ILD1, ILD2, PAS0, PLN (PLN1, PLN2), BANK, ENCAP (PAS1, PCL, PAS2), T-BUF, T-ILD, and PAC disposed on the emission areas EA in the second sub-display area NA and the first sub-display area OA1 can also be disposed on the transmission area TA1 in the first sub-display area OA1.

However, in the emission areas EA in the second sub-display area NA and the first sub-display area OA1, not only an insulating material but also material layers having electrical characteristics (e.g., a metal material layer, a semiconductor layer, etc.) may not be disposed on the transmission area TA1 in the first sub-display area OA1.

For example, referring to FIG. 5, the metal material layers ML1, ML2, GATE, GM, TM, SD1, and SD2 and the active layer ACT related to transistors may not be disposed on the transmission area TA1.

In addition, the anode electrode AE and the cathode electrode CE included in the light-emitting element ED may not be disposed in the transmission area TA1. However, the emission layer EL can be disposed in the transmission area TA1 and can be not disposed in the transmission area TA1.

Therefore, because material layers having electrical characteristics (e.g., a metal material layer, a semiconductor layer, etc.) are not disposed in the transmission area TA1 in the first sub-display area OA1, light transmittance of the transmission area TA1 in the first sub-display area OA1 can be improved. Thus, the optical electronic device 11 can receive light transmitted through the transmission area TA1 and perform a corresponding function (e.g., sensing an image sensing).

Because the entire transmission area TA1 in the first sub-display area OA1 or apart thereof overlaps the optical electronic device 11, transmittance of the transmission area TA1 in the first sub-display area OA1 can be increased to operate the optical electronic device 11 normally.

To this end, in the display panel 110 of the display device 100 according to embodiments of the present disclosure, the transmission area TA1 in the first sub-display area OA1 can have a transmittance improvement structure (TIS).

Referring to FIG. 5, a plurality of insulating films included in the display panel 110 can include the buffer layers MBUF, ABUF1, and ABUF2 between the substrates SBU1 and SUB2 and the transistors DRT and SCT, the planarization layers PLN1 and PLN2 between the transistor DRT and the light-emitting element ED, the encapsulation layer ENCAP on the light-emitting element ED, etc.

The plurality of insulating films included in the display panel 110 can include the touch buffer layer T-BUF and the touch interlayer insulating layer T-ILD on the encapsulation layer ENCAP The transmission area TA1 in the first sub-display area OA1 can have, as the TIS, a structure in which the first planarization layer PLN1 and the passivation layer PAS0 are dented.

Among the plurality of insulating films, the first planarization layer PLN1 can include at least one irregularity portion (or depressed portion). Here, the first planarization layer PLN1 can be an organic insulating film.

When the first planarization layer PLN1 is dented, planarization can be performed actually using the second planarization layer PLN2. Meanwhile, the second planarization layer PLN2 can also be depressed. In this case, planarization can be performed actually using the second encapsulation layer PCL.

Depressed portions of the first planarization layer PLN1 and the passivation layer PAS0 can extend to an upper portion of the second substrate SUB2 while passing through the insulating films ILD2, IDL1, and GI for forming the transistor DRT and the buffer layers ABUF1, ABUF2, and MBUF below the insulating films ILD2, IDL1, and GI.

The substrate SUB can include at least one concave part as a TIS. For example, in the transmission area TA1, an upper side of the second substrate SUB2 can be depressed or penetrated.

The first encapsulation layer PAS1 and the second encapsulation layer PCL, which constitute the encapsulation layer ENCAP, can also have a depressed TIS. Here, the second encapsulation layer PCL can be an organic insulating film.

In some cases, the substrate SUB may not include a concave part in the transmission area TA1, and the first encapsulation layer PAS1 and the second encapsulation layer PCL, which constitute the encapsulation layer ENCAP, can have a flat side.

The protective layer PAC can be disposed while covering the touch sensor TS on the encapsulation layer ENCAP to protect the touch sensor TS.

The touch sensor TS can include a net-type touch sensor metal TSM. For example, when the touch sensor TS is disposed in the first sub-display area OA1, the touch sensor TS includes a plurality of first touch sensor lines TSL1 arranged in parallel at certain intervals in a first direction and a plurality of second touch sensor lines TSL2 arranged in a direction crossing the first touch sensor lines TSL1 so as to improve light transmittance of the first sub-display area OA1.

A structure of the touch sensor TS and the relationship between subpixels will be described in detail with reference to FIG. 6A below.

In the display panel 110 including the first sub-display area OA1, a net type touch sensor TS is configured to improve light transmittance of the first sub-display area OA1 and prevent a reduction of touch sensitivity.

Figure 6A:
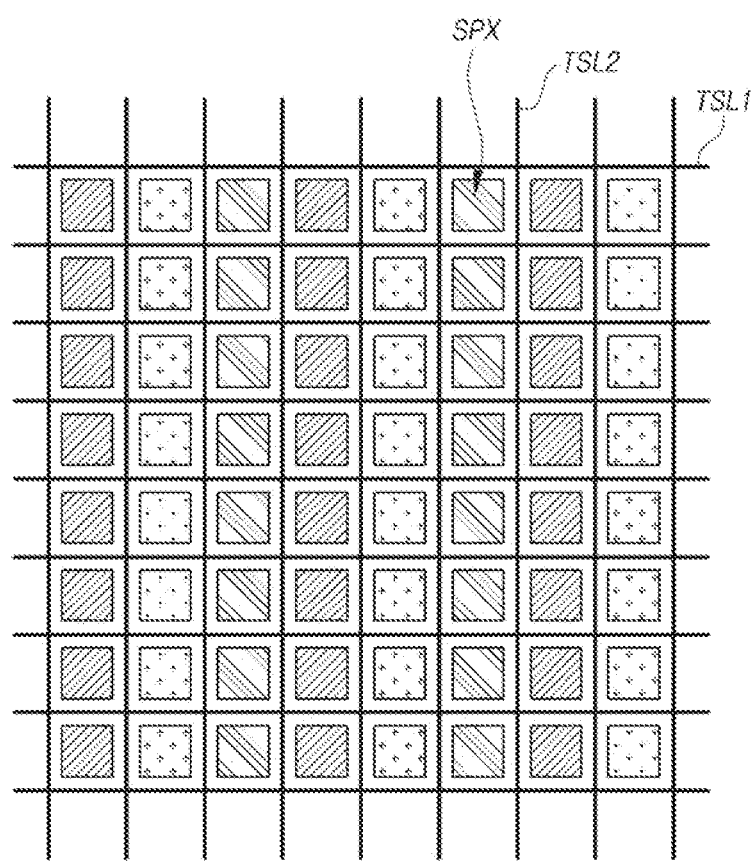
FIG. 6A is a schematic diagram showing a relationship between a touch electrode and a pixel in a display area according to embodiments of the present disclosure.

Referring to FIG. 6A, the net type touch sensor TS form a net form by a plurality of first touch sensor lines TSL1 arranged in parallel at certain intervals in a first direction, which can be an X-axis direction, and a plurality of second touch sensor lines TSL2 arranged in parallel at certain intervals in a second direction, which can be a Y-axis direction, crossing the first touch sensor lines TSL1.

One grid divided by the first touch sensor lines TSL1 and the second touch sensor lines TSL2 form meshes of a net. The meshes of the net can be referred to as meshes.

One sub-pixel SPX is disposed to correspond to each mesh. Therefore, an emission layer disposed on a sub-pixel is not hidden by a touch sensor metal.

In addition, in the touch sensor TS, the first touch sensor lines TSL1 and the second touch sensor lines TSL2 are cut in a certain pattern to form a touch sensor metal TSM.

A configuration of the touch sensor metal TSM of the net type touch sensor TS will be described in detail with reference to FIG. 6B below.

In detail, the touch sensor metal TSM includes driving touch electrodes TXE and sensing touch electrodes RXE that are adjacent to each other. Adjacent driving touch electrodes TXE are electrically connected to form a driving touch line TXL. When the sensing touch electrode RXE is located between driving touch electrodes TXE, the driving touch electrodes TXE can be connected to each other through the bridge electrode BRG. In contrast, when the driving touch electrode TXE is located between sensing touch electrodes RXE, the sensing touch electrodes RXE can be connected to each other through the bridge electrode BRG.

Figure 6B:
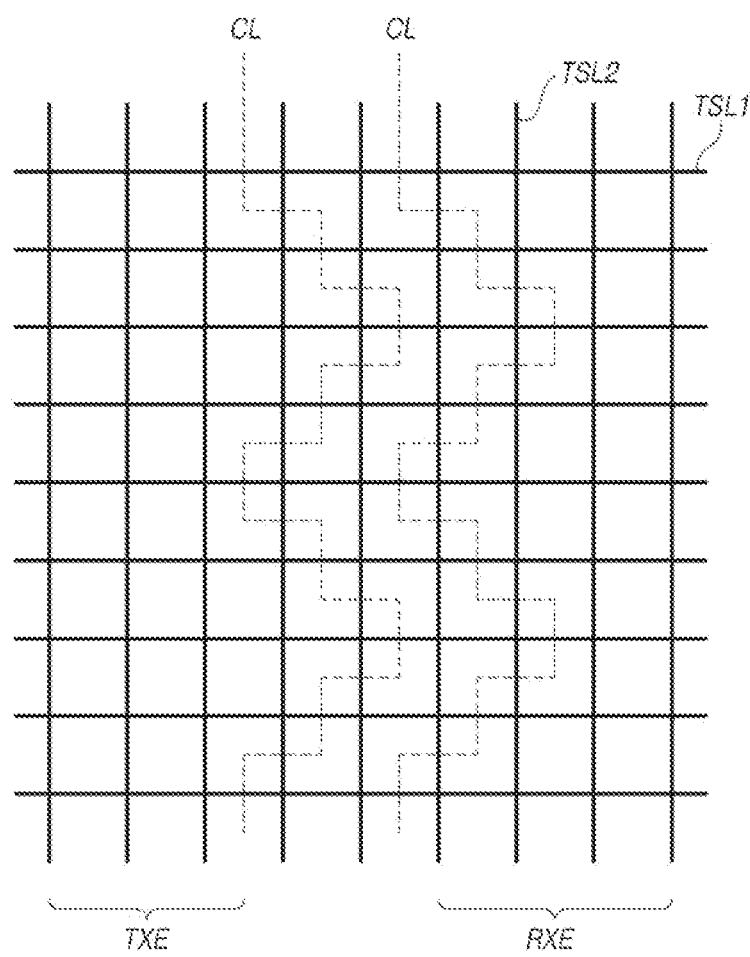
FIG. 6B is a schematic diagram showing a relationship between touch electrodes divided in a part of a touch panel corresponding to a display area according to embodiments of the present disclosure.

Referring to FIG. 6B, because all of the first touch sensor lines TSL1 and the second touch sensor lines TSL2 constituting the net type touch sensor TS are located on a touch interlayer insulating layer, the net type touch sensor TS can be cut along a cutting line CL into the driving touch electrodes TXE and the sensing touch electrodes RXE to be divided into touch sensor metals TSM.

Figure 8:
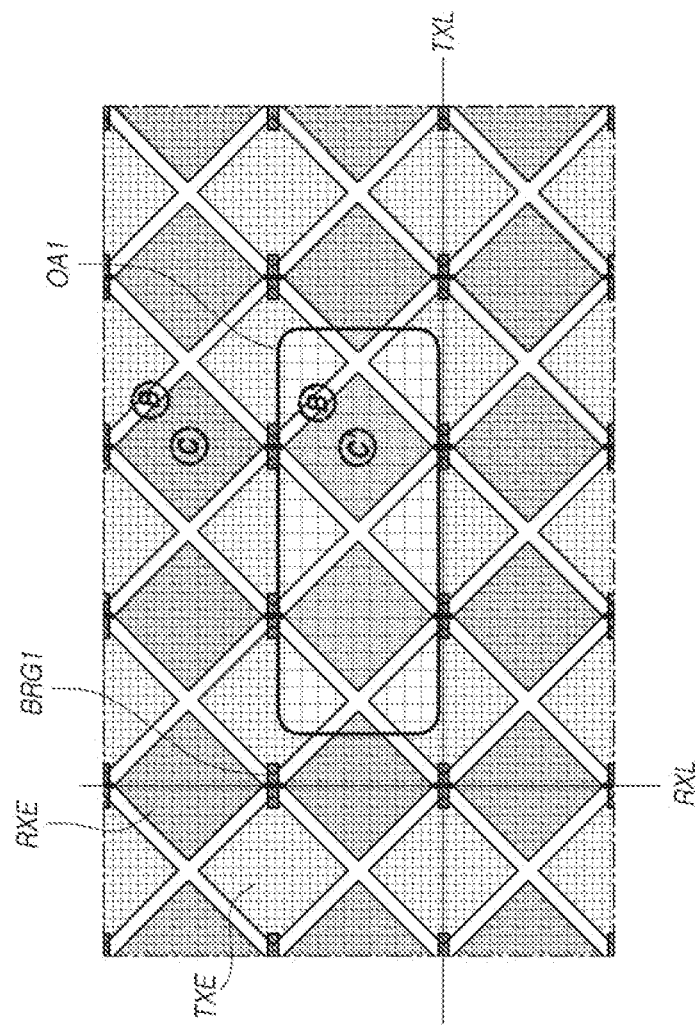
FIG. 8 is an enlarged view of a part A of FIG. 7 corresponding to a first sub-display area and a second sub-display area around the first sub-display area according to embodiments of the present disclosure.

As a result, referring to FIG. 8, the driving touch electrodes TXE and the sensing touch electrodes RXE can form a diamond shape when viewed from a distance.

Referring to FIG. 6B, the driving touch electrodes TXE and the sensing touch electrodes RXE can be separated along two cutting lines CL spaced a certain distance from each other to prevent short circuit between the driving touch electrodes TXE and the sensing touch electrodes RXE.

Figure 7:
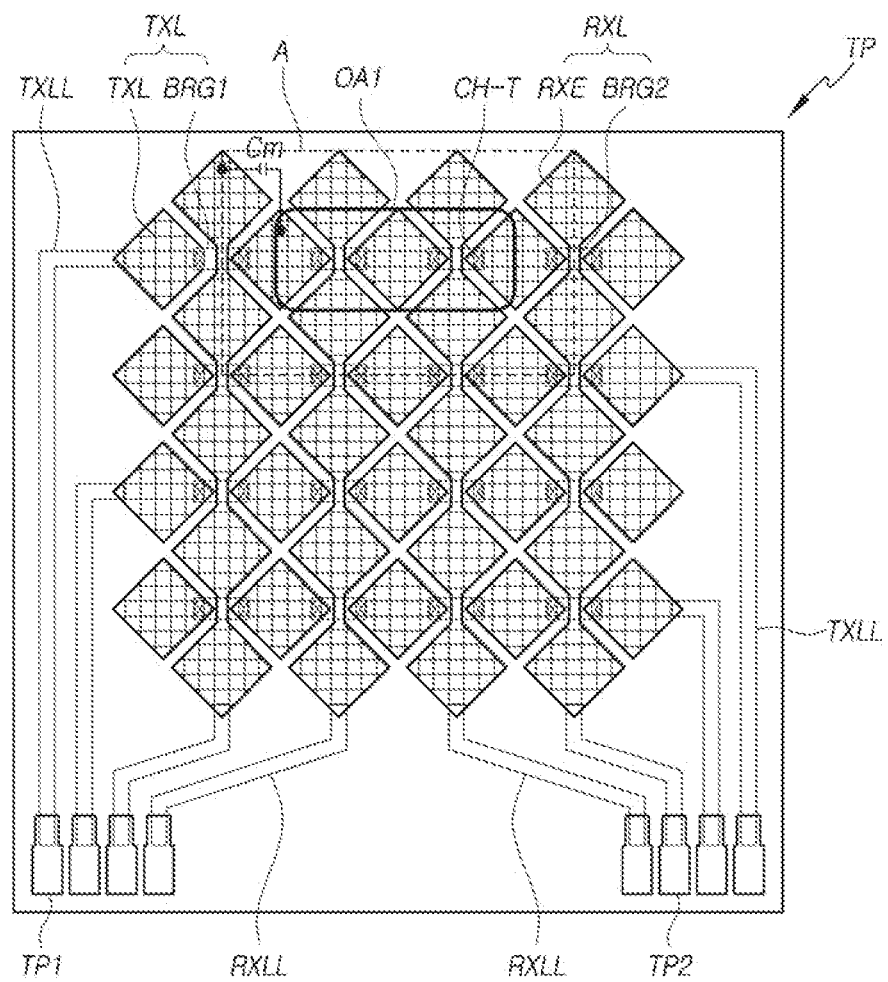
FIG. 7 is a plan view of a touch panel according to embodiments of the present disclosure.

FIG. 7 is a schematic plan view of a touch panel. A touch panel TP includes driving touch electrodes TXE and sensing touch electrodes RXE that are arranged in a matrix.

Adjacent driving touch electrodes TXE are connected through a first bridge electrode BRG1 to form driving touch lines TXL. In FIG. 7, the driving touch lines TXL can be interconnections arranged in the X-axis direction.

Adjacent sensing touch electrodes RXE are connected through a second bridge electrode BRG2 to form sensing touch lines RXL.

Because a short circuit can occur when the first bridge electrode BRG1 and the second bridge electrode BRG2 are located on the same plane, one bridge electrode BRG among the first bridge electrode BRG1 and the second bridge electrode BRG2 can be located below the touch interlayer insulating layer T-ILD to connect neighboring electrodes. For example, the first bridge electrode BRG1 can be located below the touch interlayer insulating layer T-ILD to connect driving touch electrodes TXE to each other. In this case, the second bridge electrode BRG2 can be located on the touch interlayer insulating layer T-ILD and integrally formed with an adjacent sensing touch electrode RXE to connect sensing touch electrodes RXE to each other. The first bridge electrode BRG1 can be connected to the driving touch electrode TXE on the touch interlayer insulating layer T-ILD through a contact hole CH-T formed in the touch interlayer insulating layer T-ILD.

The driving touch line TXL can be connected to a touch pad TP1 through a driving touch link line TXLL, which can be disposed in a non-display area NDA, and the sensing touch line RXL can be connected to a touch pad TP2 through a sensing touch link line RXLL.

An enlarged view in which an area A corresponding to parts of the first sub-display area OA1 and the second sub-display area NA of FIG. 7 will be described with reference to FIG. 8 below.

FIG. 8 illustrates an example in which driving touch electrodes TXE are arranged in an X-axis direction and sensing touch electrodes RXE are arranged in a Y-axis direction. However, the opposite is possible.

Figure 12A:
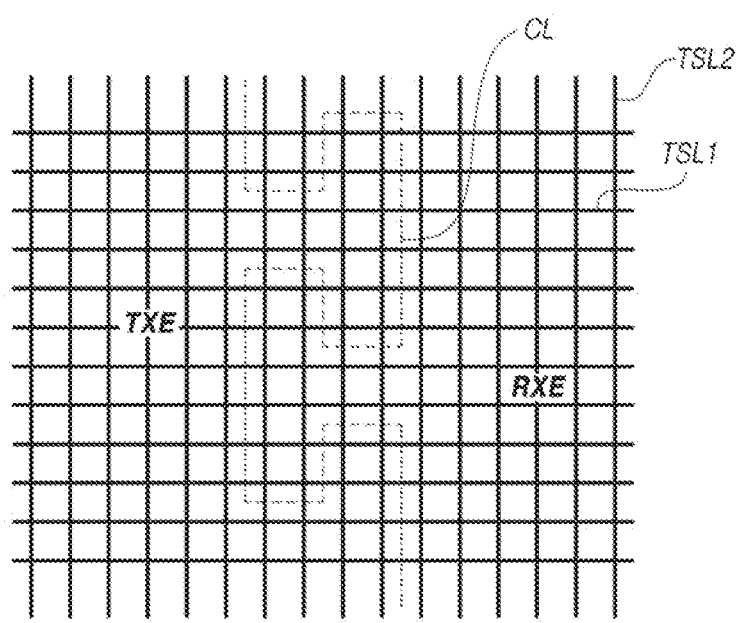
FIG. 12A is a plan view of a cut line of a touch panel in an area B' corresponding to the first sub-display area of FIG. 9 according to another embodiment.

A touch panel TP corresponding to a display area DA has a net form in which a grid is formed by first touch sensor lines TSL1 arranged to be spaced a first distance from each other and second touch sensor lines TSL2 arranged to be spaced the first distance from each other while crossing the first touch sensor lines TSL1 (TSL1 and TSL2 are shown in FIG. 12A). A distance between the first touch sensor lines TSL1 and a distance between the second touch sensor lines TSL2 can be different from each other. However, it is assumed that in this example, the distance between the first touch sensor lines TSL1 and the distance between the second touch sensor lines TSL2 are the same.

For reference, a touch panel disposed in the display area DA can be divided into a first touch area corresponding to a first sub-display area OA1 and a second touch area corresponding to a second sub-display area NA.

The distance between the first touch sensor lines TSL1 and the distance between the second touch sensor lines TSL2 are the same in the entire second sub-display area NA excluding the first sub-display area OA1.

However, in the first sub-display area OA1, the distance between the first touch sensor lines TSL1 and the distance between the second touch sensor lines TLS2 can be a second distance greater than the first distance. This is not to prevent light from entering a touch panel disposed in the first sub-display area OA1. For example, as the distance between the first touch sensor lines TSL1 and the distance between the second touch sensor line TSL2 are reduced, the amount of light entering the first sub-display area OA1 from the outside is reduced.

The second distance can be greater by an integer multiple of the first distance. For example, the first touch sensor lines TSL1 and the second touch sensor lines TSL2 arranged in the second sub-display area NA can be arranged at the first interval. The first touch sensor lines TSL1 and the second touch sensor lines TSL2 arranged in the first sub-display area OA1 can be arranged at the second interval greater than the first interval. Accordingly, only some of the first touch sensor lines TSL1 and the second touch sensor lines TSL2 arranged in the second sub-display area NA can be arranged to correspond to the first touch sensor lines TSL1 and the second touch sensor lines TSL2 arranged in the first sub-display area OA1. For example, the first touch sensor lines TSL1 and the second touch sensor lines TSL2 of every two or every three in the second sub-display area NA does not match the first touch sensor lines TSL1 and the second touch sensor lines TSL2 in the first sub-display area OA1. Therefore, the first touch sensor lines TSL1 and the second touch sensor lines TSL2 in the first sub-display area OA1 are arranged at a lower density than a density in which the first touch sensor lines TSL1 and the second touch sensor lines TSL2 are arranged in the second sub-display area NA, so that the second distance is greater by an integer multiple of the first distance.

As such, when a density in which touch sensor lines are arranged in the first sub-display area OA1 and a density in which touch sensor lines are arranged in the second sub-display area NA are different from each other, touch sensitivity of a touch sensor metal in the first sub-display area OA1 can decrease.

Therefore, in a first embodiment of the present disclosure, a method of increasing areas of neighboring touch sensor metals is provided to compensate for a reduction of touch sensitivity due to a low density of touch sensor lines in the first sub-display area OA1.

Specifically, FIG. 8 illustrates a comparison between an area C corresponding to the inside of a touch sensor metal on a second sub-display area and an area C' corresponding to the inside of a touch sensor metal on a first sub-display area, and a comparison between an area B corresponding to a border between touch sensor metals on the second sub-display area and an area B' corresponding to a border between touch sensor metals on the first sub-display area.

Figure 9:
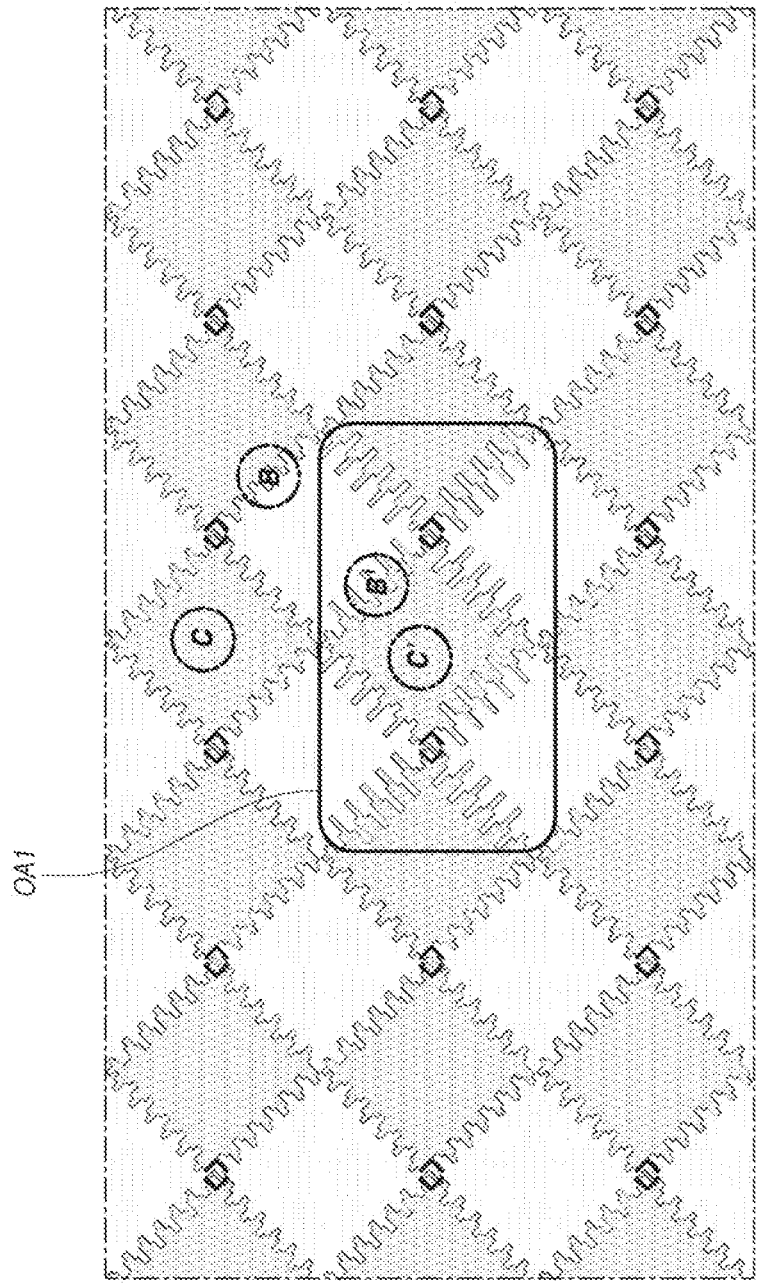
FIG. 9 is a plan view of a structure of a touch electrode in an area of a touch panel corresponding to a first sub-display area according to an embodiment of the present disclosure.

FIG. 9 is a plan view of an actual structure in which a touch sensor metal to which the first embodiment of the present disclosure is applied is disposed in a first sub-display area OA1 and a second sub-display area NA.

Referring to FIG. 8, touch sensor lines are arranged at a lower density in the first sub-display area OA1.

On the other hand, referring to FIG. 9, a comparison between an area B corresponding to a border between touch sensor metals in a second sub-display area and an area B' corresponding to a border between touch sensor metals in a first sub-display area reveals that a touch sensor metal includes a finger structure in the area B' corresponding to the border between the touch sensor metals in the first sub-display area.

For example, when the mutual capacitance method is employed for a touch sensor, a capacitance increases when an area between a driving touch electrode TXE and a neighboring sensing touch electrode RXE is increased. Therefore, in the first embodiment of the present disclosure, edges of the driving touch electrode TXE and the sensing touch electrode RXE can have the finger structure.

Figure 10:
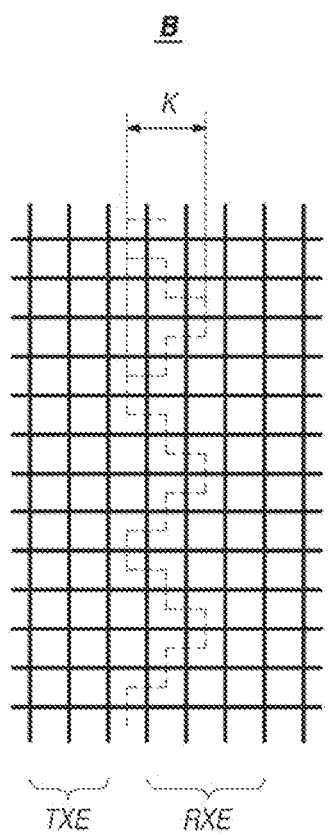
FIG. 10 illustrates a part of a cut line of the touch panel in an area B corresponding to the second sub-display area of FIG. 9.
Figure 11A:
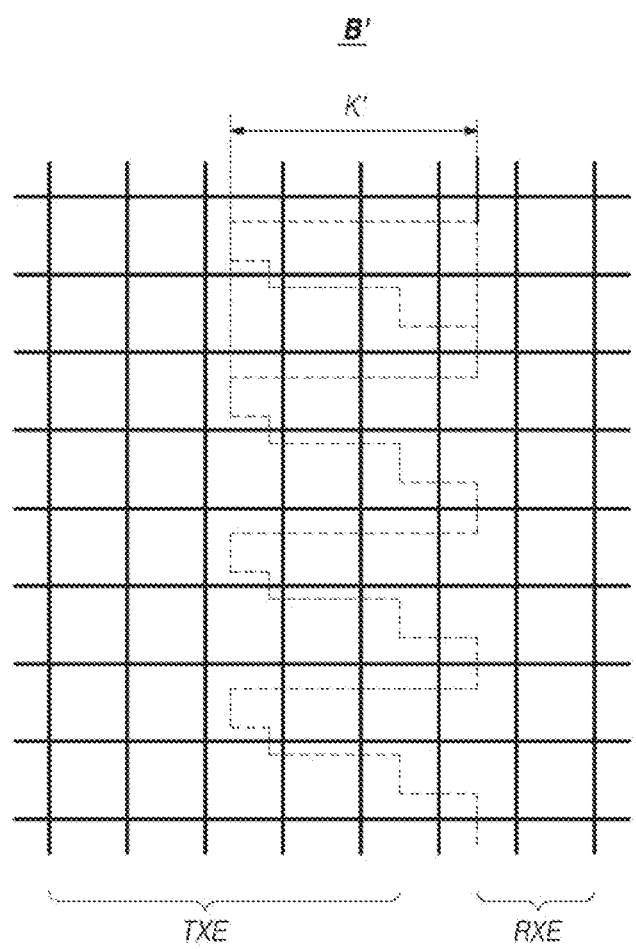
FIG. 11A illustrates a part of a cut line of a touch panel in an area B' corresponding to the first sub-display area of FIG. 9.

This will be described with reference to FIGS. 10 and 11A below. FIG. 10 illustrates a structure of a cutting line formed at a border between a driving touch electrode TXE and a sensing touch electrode RXE in the second sub-display area NA of FIGS. 8 and 9. Referring to FIG. 10, a space between the driving touch electrode TXE and the sensing touch electrode RXE is cut in a zigzag pattern along a cutting line CL to form fingers each having a first length with extending to the driving touch electrode TXE or the sensing touch electrode RXE. A total length of the fingers is marked as K.

On the other hand, in the first sub-display area OA1, a cutting line L is formed in the zigzag pattern between the driving touch electrode TXE and the sensing touch electrode RXE to extend deeply into the driving touch electrode TXE or the sensing touch electrode RXE. For example, edges of the driving touch electrode TXE and the sensing touch electrode RXE in the first sub-display area OA1 are provided with fingers extending deeply into the driving touch electrode TXE or the sensing touch electrode RXE. When a length of fingers formed in the first sub-display area OA1 is K', K' is longer than K.

Therefore, areas of edges of a driving touch electrode TXE and a sensing touch electrode RXE facing each other in the first sub-display area OA1 can increase, thus increasing a mutual capacitance.

Borders between driving touch electrodes TXE and sensing touch electrodes RXE facing each other among all of driving touch electrodes TXE and sensing touch electrodes RXE in the first sub-display area OA1 are provided with fingers longer than fingers formed in borders of the second sub-display area NA.

In the first embodiment of the present disclosure, the sizes of the driving touch electrode TXE and the sensing touch electrode RXE can be substantially the same in the first sub-display area OA1 and the second sub-display area NA.

Figure 11B:
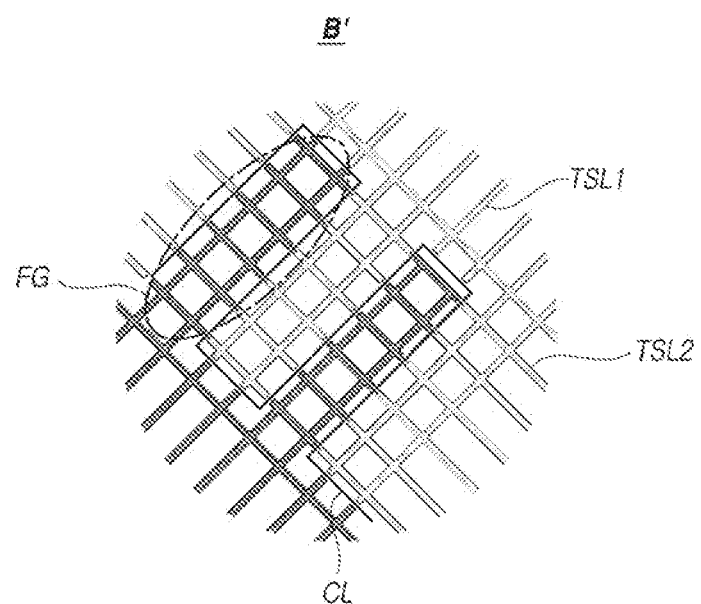
FIG. 11B is a detailed diagram of a structure of FIG. 11A.

FIG. 11B illustrates a configuration of a finger FG formed by cutting a first touch sensor line TSL1 and a second touch sensor line TSL2 in an area B' in a first sub-display area OA1 along a cutting line.

In the first embodiment of the present disclosure, a finger can have a different shape. Referring to FIG. 12A, the finger can enter, in a villous form, the driving touch electrode TXE and the sensing touch electrode RXE. Therefore, areas of the driving touch electrode TXE and the sensing touch electrode RXE can increase when edges of the driving touch electrode TXE and the sensing touch electrode RXE face each other.

Figure 12B:
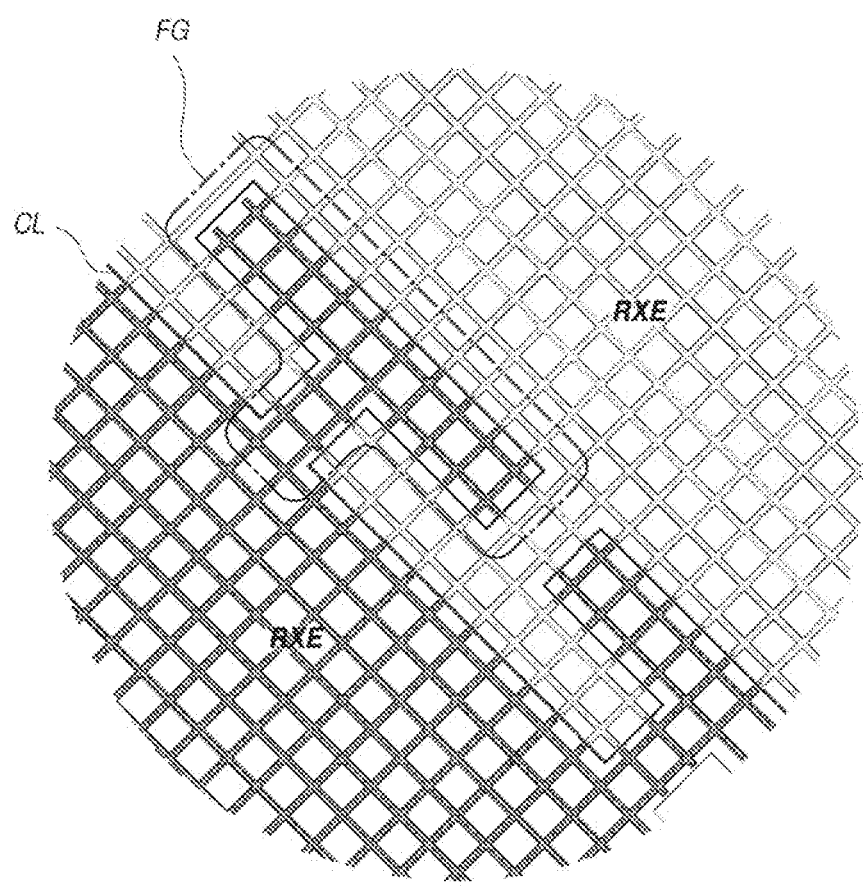
FIG. 12B is a detailed diagram of a structure of FIG. 12A.

FIG. 12B illustrates a configuration of a finger FG formed by cutting a first touch sensor line TSL1 and a second touch sensor line TSL2 in an area B' in a first sub-display area OA1 along a cutting line.

Figure 13:
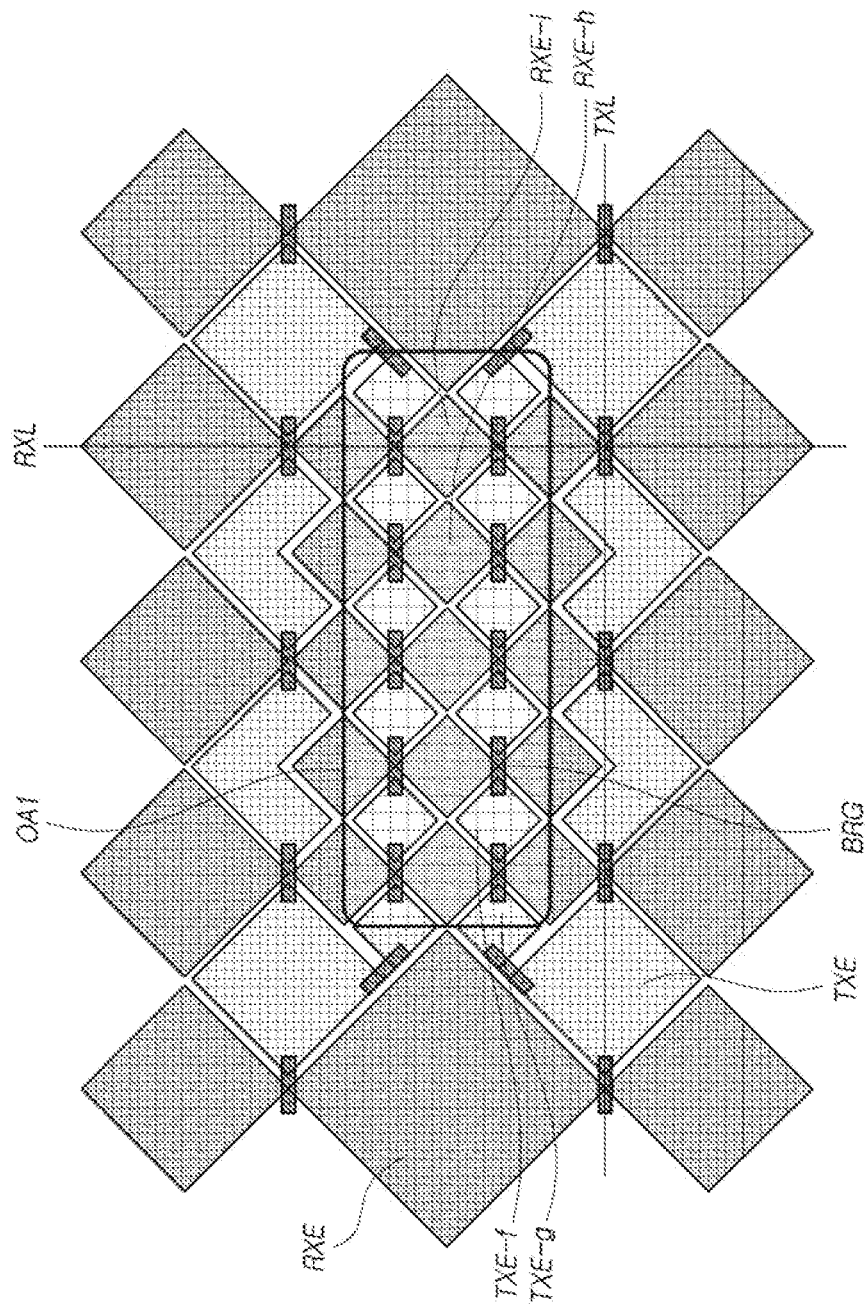
FIG. 13 is a plan view of a structure of a touch electrode in an area of a touch panel corresponding to a first sub-display area according to another embodiment of the present disclosure.

FIG. 13 suggests another structure in which a capacitance between touch electrodes in a first sub-display area OA1 increases, according to a second embodiment of the present disclosure.

Referring to FIG. 13, densities in which a first touch sensor line TSL1 and a second touch sensor line TSL2 are arranged in the first sub-display area OA1 are the same as those in the first embodiment of FIG. 7. A description thereof may be omitted or may be provided briefly.

However, in the second embodiment, sizes of touch sensor metals TSM disposed in the first sub-display area OA1 can be less than those of touch sensor metals TSM disposed in a second sub-display area NA (In here, Touch sensor metal TSM means touch electrode TXE and touch electrode RXE).

The sizes of the touch sensor metals TSM in the second sub-display area NA can be substantially the same. The sizes of the touch sensor metals TSM in the first sub-display area OA1 can also be substantially the same. However, the sizes of the touch sensor metals TSM in the first sub-display area OA1 are less than those of the touch sensor metals TSM in a second sub-display area NA.

Therefore, the number of touch sensor metals TSM per unit area in the first sub-display area OA1 can be increased, thereby increasing the number of bridge electrodes BRG per unit area.

Actually, the driving touch electrode TXE and the sensing touch electrode RXE are spaced hundreds of micrometers (μm) apart from each other, whereas the size of the bridge electrode BRG is several micrometers (μm). Therefore, many bridge electrodes BRG per unit area can be understood to mean that a mutual capacitance is large.

Therefore, in the second embodiment of the present disclosure, the number of bridge electrodes BRG per unit area can be increased by reducing a size of a touch sensor metal TSM to be disposed in the first sub-display area OA1, thereby increasing a capacitance.

Meanwhile, touch sensor metals TSM are connected to each other in a column, thus forming the driving touch line TXL and the sensing touch line RXL. In other words, the touch sensor metal TSM can be directly connected to the driving touch line TXL and the sensing touch line RXL.

However, in the second embodiment of the present specification, the size of the touch sensor metals TSM in the first sub-display area OA1 is less than that of the touch sensor metals TSM in the second sub-display area NA, and thus, some of the touch sensor metals TSM in the first sub-display area OA1 cannot be directly connected to the driving touch lines TXL or the sensing touch lines RXL and can be indirectly connected to the driving touch lines TXL or the sensing touch lines RXL.

For example, referring to FIG. 13, a driving touch electrode TXE-f in the first sub-display area OA1 can be connected to the driving touch line TXL through a driving touch electrode TXE-g in the first sub-display area OA1. Similarly, a sensing touch electrode RXE-h in the first sub-display area OA1 can be connected to the sensing touch line RXL through a sensing touch electrode RXE-i in the first sub-display area OA1.

Of course, it is clear that some of the touch sensor metals TSM in the first sub-display area OA1 can be directly connected to the driving touch line TXL or the sensing touch line RXL.

In the second embodiment of the present disclosure, the touch sensor metal TSM can also be defined by cutting a first touch sensor line TSL1 and a second touch sensor line TSL2 along a cutting line in a net form as shown in FIG. 6B.

Figure 14:
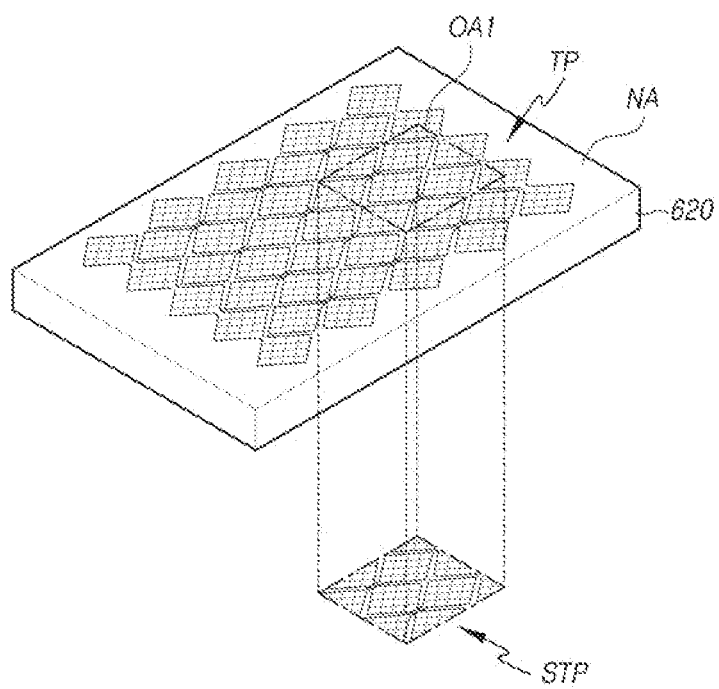
FIG. 14 is a perspective view of a structure of a touch electrode in an area of a touch panel corresponding to a first sub-display area according to another embodiment of the present disclosure.

Next, a third embodiment of the present disclosure will be described with reference to FIGS. 14 to 15C below.

In the third embodiment, a touch panel TP includes a touch panel TP formed on a touch interlayer insulating layer T-ILD and a sub-touch panel STP corresponding to a first sub-display area OA1 and disposed below the touch interlayer insulating layer T-ILD. The touch panel TP can have the same structure as the touch panel TP of the first embodiment described above.

For example, the touch panel TP can include a first touch area corresponding to the first sub-display area OA1 and a second touch area corresponding to a second sub-display area NA, and sizes of meshes arranged in the first touch area can be greater than those of meshes arranged in the second touch area. One of the driving touch electrodes TXE and the sensing touch electrodes RXE can be directly connected to each other and the other of the driving touch electrodes TXE and the sensing touch electrodes RXE can be connected to each other through a bridge electrode BRG.

In this case, the bridge electrode BRG can be disposed below the touch interlayer insulating layer 620.

In the third embodiment of the present disclosure, a sub-touch panel STP is further formed below the touch interlayer insulating layer 620 in the first sub-display area OA1 to increase sensing sensitivity of a touch sensor metal disposed in the first sub-display area OA1. A touch sensor metal TSM on the touch interlayer insulating layer 620 in the first sub-display area OA1 and touch sensor metals in the sub-touch panel STP can be electrically connected to one another.

A configuration of the sub-touch panel STP can be the same as that of the touch sensor metal TSM on an upper side of the touch interlayer insulating layer 620 in the first sub-display area OA1. However, a relationship between touch sensor metals can be different to avoid a short circuit between a driving touch electrode TXE and a sensing touch electrode RXE formed on the same plane.

Figure 15A:
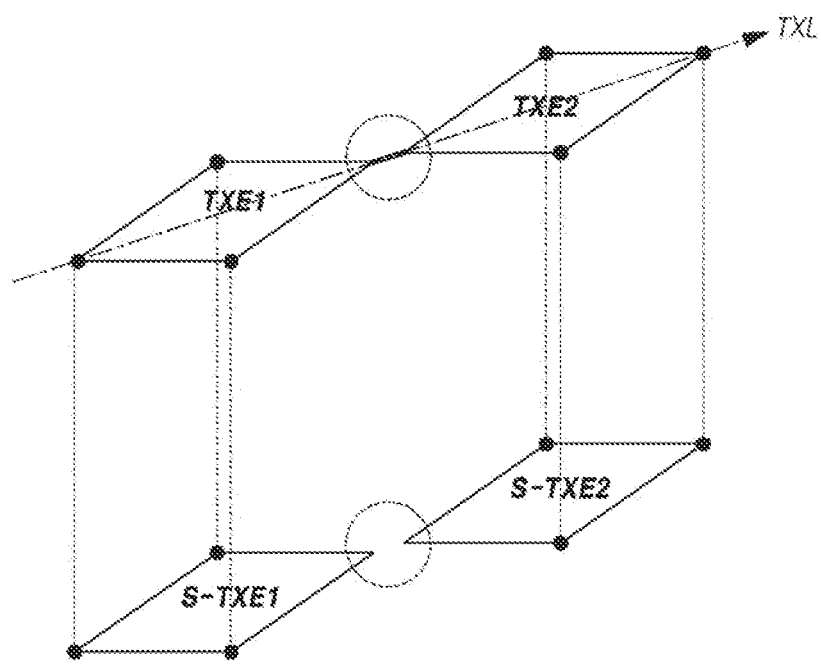
FIGS. 15A, 15B, and 15C are perspective views showing examples of a relationship between touch electrodes of the embodiment of the present disclosure shown in FIG. 14.
Figure 15B:
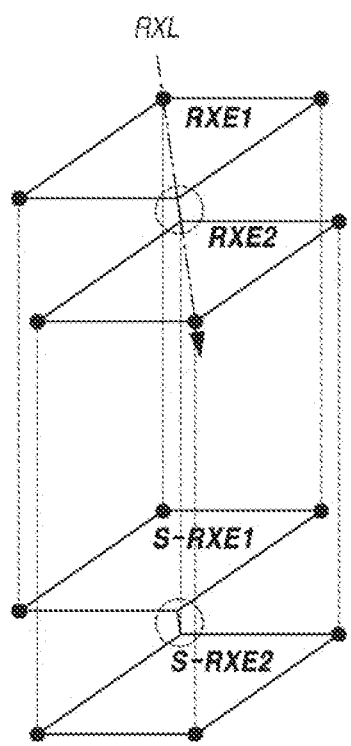

A relationship between a touch sensor metal TSL in a first sub-display area OA1 and a sub-touch sensor metal below a touch interlayer insulating layer 620 in the first sub-display area OA1 will be described with reference to FIGS. 15A to 15C below.

The touch sensor metal TSM in the first sub-display area OA1 includes a driving touch electrode TXE and a sensing touch electrode RXE. The sub-touch sensor metal below the touch interlayer insulating layer 620 in the first sub-display area OA1 includes a sub-driving touch electrode S-TXE and a sub-sensing touch electrode S-RXE.

An example will be described with reference to FIG. 15A below.

A first driving touch electrode TXE1 and a second driving touch electrode TXE2 can be disposed along a driving touch line TXL on the touch interlayer insulating layer 620 in the first sub-display area OA1 and electrically connected to each other. In the embodiment of FIG. 15A, the first driving touch electrode TXE1 and the second driving touch electrode TXE2 can be integrally connected.

In a touch sensor metal TSM below the touch interlayer insulating layer 620 in the first sub-display area, a first sub-driving touch electrode S-TXE1 and a second sub-driving touch electrode S-TXE2 are disposed along the driving touch line TXL and electrically disconnected from each other.

The first driving touch electrode TXE1 and the first sub-driving touch electrode S-TXE1 can be connected to each other on at least one point through a contact hole passing through the touch interlayer insulating layer 620. The second driving touch electrode TXE2 and the second sub-driving touch electrode S-TXE2 can be connected to each other on at least one point through a contact hole passing through the touch interlayer insulating layer 620. Therefore, when the first sub-display area OA1 is touched by a finger, the driving touch electrode TXE and the sub-driving touch electrode S-TXE on and below the touch interlayer insulating layer 620 can be operated together.

A relationship between sensing touch electrodes RXE in the first sub-display area OA1 will be described with reference to FIG. 15B below.

A first driving touch electrode TXE1 and a second driving touch electrode TXE2 can be disposed along a driving touch line TXL on the touch interlayer insulating layer 620 in the first sub-display area OA1, and electrically connected to each other. In the embodiment of FIG. 15A, the first driving touch electrode TXE1 and the second driving touch electrode TXE2 can be integrally connected.

In a touch sensor metal TSM below the touch interlayer insulating layer 620 in the first sub-display area, a first sub-driving touch electrode S-TXE1 and a second sub-driving touch electrode S-TXE2 are disposed along the driving touch line TXL and electrically disconnected from each other.

The first driving touch electrode TXE1 and the first sub-driving touch electrode S-TXE1 can be connected to each other on at least one point through a contact hole passing through the touch interlayer insulating layer 620. The second driving touch electrode TXE2 and the second sub-driving touch electrode S-TXE2 can be connected to each other on at least one point through a contact hole passing through the touch interlayer insulating layer 620. Therefore, when the first sub-display area OA1 is touched by a finger, the driving touch electrode TXE and the sub-driving touch electrode S-TXE on and below the touch interlayer insulating layer 620 can be operated together.

A relationship between sensing touch electrodes RXE on the first sub-display area OA1 will be described with reference to FIG. 15B below.

A first driving touch electrode TXE1 and a second driving touch electrode TXE2 can be disposed along a driving touch line TXL on the touch interlayer insulating layer 60 in the first sub-display area OA1, and electrically connected to each other. In the embodiment of FIG. 15A, the first driving touch electrode TXE1 and the second driving touch electrode TXE2 can be integrally connected.

A first sensing touch electrode RXE1 and a second sensing touch electrode RXE2 can be disposed along a sensing touch line RXL on the touch interlayer insulating layer 620 in the first sub-display area OA1, and electrically disconnected from each other.

A first sub-sensing touch line S-RXE1 and a second sub-sensing touch electrode S-RXE2 disposed below the touch interlayer insulating layer 620 in the first sub-display area OA1 can be arranged along the sensing touch line RXL, and electrically connected to each other.

The first sensing touch electrode RXE1 and the first sub-sensing touch electrode S-RXE1 can be connected to each other on at least one point through a contact hole passing through the touch interlayer insulating layer 620. The second sensing touch electrode RXE2 and the second sub-sensing touch electrode S-RXE2 can be connected to each other on at least one point through a contact hole passing through the touch interlayer insulating layer 620. Therefore, when the first sub-display area OA1 is touched by a finger, the sensing touch electrode RXE and the sub-sensing touch electrode S-RXE on and below the touch interlayer insulating layer 620 can be operated together.

Figure 15C:
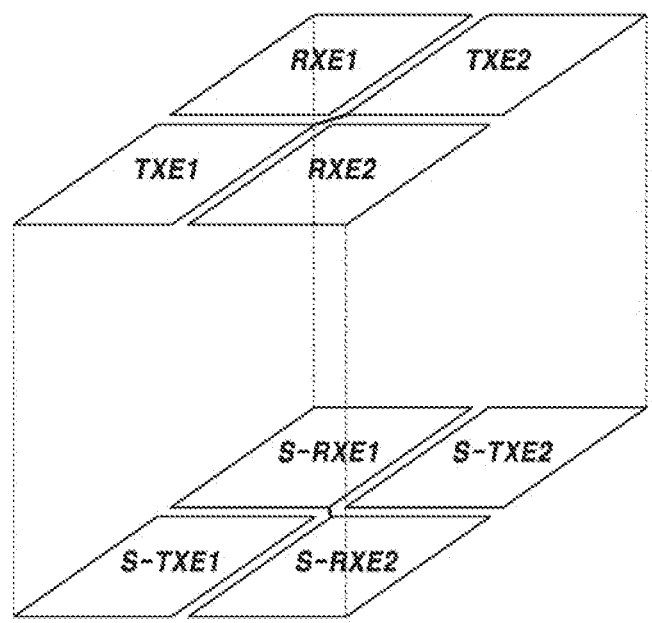

FIG. 15C illustrates a configuration of a combination of the driving touch electrode TXE and the sensing touch electrode RXE described above.

Thus, referring to FIG. 15C, a first sensing touch electrode RXE1 and a second sensing touch electrode RXE2 disconnected from each other can be electrically connected to each other by being respectively connected to a first sub-sensing touch electrode S-RXE1 and a second sub-sensing touch electrode S-RXE2 connected to each other. Similarly, a first sub-driving touch electrode S-TXE1 and a second sub-driving touch electrode S-TXE2 disconnected from each other can be electrically connected to each other by being respectively connected to a first driving touch electrode TXE1 and a second driving touch electrode TXE2 connected to each other.

In the third embodiment, the sub-driving touch electrodes S-TXE1 and S-TXE2 and the sub-sensing touch electrodes S-RXE1 and S-RXE2 below the touch interlayer insulating layer 620 can be configured as a metal layer that is the same as a bridge electrode provided in the first and second embodiments. For example, in third embodiment, actually, the first sub-sensing touch electrode S-RXE1 and the second sub-sensing touch electrode S-RXE2 below the touch interlayer insulating layer 620 can act as a bridge electrode for connecting the first sensing touch electrode RXE1 and the second sensing touch electrode RXE2.

On the other hand, although the first, second and third embodiments have been described separately, the configuration of the third embodiment can be added to the first and second embodiments to increase touch sensing sensitivity in the first sub-display area OA1.

For example, in the configuration of the first embodiment employing the finger structure, a sub-touch sensing metal connected to a touch sensing metal on the touch interlayer insulating layer 620 can be configured below the touch interlayer insulating layer 620 as in the third embodiment.

In addition, in the configuration of the second embodiment in which a touch sensor metal smaller than that in the second sub-display area NA is provided in the first sub-display area OA1, a sub-touch sensor metal according to the third embodiment can be provided to increase touch sensing sensitivity.

Although the embodiments of the present disclosure have been described above in more detail with reference to the accompanying drawings, the present disclosure is not necessarily limited thereto and can be implemented in many different forms without departing from the technical scope of the present disclosure. Therefore, the embodiments set forth herein are not intended to limit the technical scope of the present disclosure but are provided to describe the technical scope of the present disclosure, and thus the technical scope of the present disclosure is not limited by the embodiments. Therefore, it should be understood that the embodiments of the disclosure described above are merely examples in all respects and not restrictive. The scope of the present disclosure should be interpreted based on the claims, and it should be understood that all technical ideas equivalent thereto fall within the scope of the present disclosure.

What is claimed is:

1. A display device comprising:
a display panel including a display area and a non-display area adjacent to the display area, wherein the display area includes a first sub-display area including a plurality of light transmission areas and a second sub-display area adjacent to the first sub-display area;
an optical electronic device including at least one of a camera and a sensor, the optical electronic device being disposed at a back side of the display area and overlapping the first sub-display area; and
a net type touch panel disposed on a front side of the display panel, and including a first touch area corresponding to the first sub-display area and a second touch area corresponding to the second sub-display area,
wherein meshes of the first touch area are larger than meshes of the second touch area, and
an area facing each other between each touch electrode in the first touch area is greater than an area facing each other between each touch electrode in the second touch area when comparing within a unit area of same size.

2. The display device of claim 1, wherein the net type touch panel comprises a capacitive touch electrode configured to detect a capacitance generated between a driving touch electrode and a sensing touch electrode by a mutual capacitance sensing method.

3. The display device of claim 2, wherein a size of each touch electrode in the first touch area and a size of each touch electrode in the second touch area are the same.

4. The display device of claim 2, wherein an edge of each touch electrode in the first touch area includes a first finger part extending toward neighboring touch electrodes adjacent to each other,
an edge of each touch electrode in the second touch area includes a second finger part extending toward neighboring touch electrodes adjacent to each other, and
an area facing between the edge of each touch electrode having the first finger parts is greater than an area facing between the edge of each touch electrode having the second finger parts when comparing within a unit area of same size.

5. The display device of claim 4, wherein the first finger part is longer than the second finger part.

6. The display device of claim 1, wherein the net type touch panel is disposed on a touch interlayer insulating layer, and
the display device further comprises net type sub-touch electrodes disposed below the touch interlayer insulating layer and electrically connected to touch electrodes of the net type touch panel disposed on the touch interlayer insulating layer.

7. The display device of claim 6, wherein a touch electrode separated from a neighboring touch electrode among the touch electrodes disposed on a same touch line is electrically connected by a sub-touch electrode disposed on the same touch line.

8. The display device of claim 1, wherein meshes of the first touch area are larger by an integer multiple of meshes of the second touch area.

9. A display device comprising:
a display panel including a display area and a non-display area adjacent to the display area, wherein the display area includes a first sub-display area including a plurality of light transmission areas and a second sub-display area adjacent to the first sub-display area,
an optical electronic device including at lest one of a camera and a sensor, the optical electronic device being disposed at a back side of the display area and overlapping the first sub-display area; and
a touch panel disposed on a front side of the display panel, and including a plurality of first touch sensor lines arranged in parallel at predetermined intervals in a first direction and a plurality of second touch sensor lines arranged in a direction crossing the plurality of first touch sensor lines,
wherein the first touch sensor lines and the second touch sensor lines in the first sub-display area are arranged at a lower density than a density in which the first touch sensor lines and the second touch sensor lines are arranged in the second sub-display area, and
wherein an area facing each other between each touch electrode in the first sub-display area is greater than an area facing each other between each touch electrode in the second sub-display area when comparing within a unit area of same size.

10. A display device comprising:
a display panel including a display area and a non-display area adjacent to the display area, wherein the display area includes a first sub-display area including a plurality of light transmission areas and a secondi sub-display area adjacent to the first sub-display area;
an optical electronic device including at least one of a camera and a sensor, the optical electronic device being disposed at a back side of the display area and overlapping the first sub-display area;
a touch interlayer insulating layer on an upper side of the display panel;
a net type touch panel disposed on one side of the touch interlayer insulating layer, and including a first touch area corresponding to the first sub-display area and a second touch area corresponding to the second sub-display area, wherein meshes of the first touch area are larger than meshes of the second touch area; and
a net type sub-touch panel disposed on another side of the much interlayer insulating layer and electrically connected to the net type touch panel disposed in the first touch area.

11. The display device of claim 10, wherein the net type touch panel comprises driving touch electrodes and sensing touch electrodes in the form of net,
the sub-touch panel comprises sub-driving touch electrodes and sub-sensing touch electrodes in the form of net, and
the driving touch electrodes or the sensing touch electrodes are connected through one of the sub-driving touch electrode and the sub-sensing touch electrode that are disposed on the another side of the touch interlayer insulating layer.

12. The display device of claim 11, wherein, when the driving touch electrodes are arranged and connected along a driving touch line, the sensing touch electrodes are arranged along a sensing touch line crossing the driving touch line and disconnected from each other at an intersection of the driving touch line and the sensing touch line, and are electrically connected to each other through the sub-sensing electrode.

13. The display device of claim 12, wherein the sensing touch electrode and the sub-sensing electrode are connected to each other through a contact hole formed in the touch interlayer insulating layer.

14. The display device of claim 12, wherein sub-driving touch electrodes arranged along the driving touch line are physically separated from each other, and each of the sub-driving touch electrodes electrically connects to corresponding one of the driving touch electrodes.

15. The display device of claim 12, wherein sensing touch electrodes arranged along the sensing touch line are physically separated from each other and each of the sensing touch electrodes electrically connects to corresponding one of sub-sensing touch electrodes.

* * * * *